(12) United States Patent
Zeng et al.

(10) Patent No.: US 9,977,476 B2
(45) Date of Patent: May 22, 2018

(54) POWER SUPPLY APPARATUS

(71) Applicant: DELTA ELECTRONICS, INC., Taoyuan (TW)

(72) Inventors: Jian-Hong Zeng, Taoyuan (TW); Chao Yan, Taoyuan (TW); Pei-Qing Hu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 78 days.

(21) Appl. No.: 14/840,063

(22) Filed: Aug. 31, 2015

(65) Prior Publication Data
US 2016/0062428 A1    Mar. 3, 2016

(30) Foreign Application Priority Data
Sep. 2, 2014    (CN) .......................... 2014 1 0442972

(51) Int. Cl.
*G06F 1/26* (2006.01)
*G06F 1/20* (2006.01)

(52) U.S. Cl.
CPC . *G06F 1/26* (2013.01); *G06F 1/20* (2013.01)

(58) Field of Classification Search
None
See application file for complete search history.

(56) References Cited

U.S. PATENT DOCUMENTS

| | | | | |
|---|---|---|---|---|
| 7,068,515 B2* | 6/2006 | Harris | .................. | H05K 7/1092 165/80.3 |
| 2002/0131258 A1* | 9/2002 | Inoue | ..................... | H05K 1/141 361/803 |
| 2005/0189566 A1* | 9/2005 | Matsumoto | ....... | H02M 3/33538 257/200 |
| 2008/0101025 A1 | 5/2008 | Harris et al. | | |
| 2010/0093132 A1* | 4/2010 | Elbanhawy | ............. | H01L 25/16 438/108 |
| 2012/0173892 A1 | 7/2012 | Tong et al. | | |
| 2014/0306674 A1* | 10/2014 | Kondou | ................ | H02M 3/158 323/271 |

FOREIGN PATENT DOCUMENTS

| | | |
|---|---|---|
| CN | 1332512 A | 1/2002 |
| CN | 103596365 A | 2/2014 |
| CN | 103824853 A | 5/2014 |
| CN | 103872036 A | 6/2014 |
| GB | 2399684 A | 9/2004 |
| TW | M253836 U | 12/2004 |

\* cited by examiner

*Primary Examiner* — Paul Yanchus, III
(74) *Attorney, Agent, or Firm* — CKC & Partners Co., Ltd.

(57) ABSTRACT

Disclosed herein is a power supply apparatus that includes a main board, a power unit, a control unit, pads and a pin. The control unit and the power unit are stacked on the main board and at a position in adjacent to a load; the plurality of pads are distributed along the lateral side of the power unit and the lateral side of the control unit; the plurality of pins and pads are electrically coupled and electrically coupled with the main board, the control unit and the power unit; the control unit is configured to control the power unit, so that the power unit supplies electricity to the adjacent load.

18 Claims, 11 Drawing Sheets

POWER SUPPLY APPARATUS

RELATED APPLICATIONS

This application claims priority to China Application Serial Number 201410442972.6, filed Sep. 2, 2014, which is herein incorporated by reference.

BACKGROUND

Field of Invention

The present invention relates to a power supply apparatus. More particularly, the present invention relates to the internal structure of a power supply apparatus.

Description of Related Art

With people's increased demand to the intelligent life, the society's need to data processing is also growing. The global energy consumption spent on data processing averages thousands or even tens of thousands kilowatt-hour (KWH); and a large scale data center may occupy tens of thousands square meters. Therefore, a greater efficiency and higher power density are the key index for the healthy development of this industry.

The key component of the data center is the server, which has a main board that usually composed of data processing chips such as CPU, chipsets, memory, etc., and the power supply and necessary peripheral components thereof. With the improvement of the processing capability of the server unit volume, the numbers of these chips and the integration level thereof are also increased, which results in the increase of the space occupied and the power consumption. Therefore, the power supply for supplying these chips (also referred to as the main board power supply because it is disposed on the same main board as the data processing chip is) is expected to exhibit greater efficiency, higher power density and more compact volume, so as to realize the energy-saving of the whole server or event the whole data center and reduction of the floor space.

In the server, the main board PCB is configured to transmit the energy and signal. On the main board PCB, a data processing chip and a power supply thereof are disposed. The height of the casing of the server is often a standard value, which is defined using the industrial standard "U"; for example, 1U, 1.5U, 2U, etc. (1U=1.75 inch=44.45 mm). For example, for a server with a height of 1U (about 40 mm; the actual size of the 1U device may vary due to the fit tolerance), the main board is a PCB consisting of 6 to 50 layers, which is very expensive to manufacture. In the case where the height of the server casing is limited, in order to ensure the expected efficiency, by reducing the area that the main board power supply occupies on the main board (that is, the horizontal area of the main board power supply), it is possible to reduce the over volume, increase the power density, and accordingly, lower the manufacturing cost. In the present disclosure, the power of the power supply unit horizontal area is referred to as the "power pressure".

When using the same technology level in designing a power supply having a power of Po, the greater the volume (V) of the power supply, the easier to achieve a higher efficiency; that is, the power efficiency is positively proportional to the volume (V). The volume (V) equals to the product of the height (H) and the horizontal area (S). The power pressure (Pp) equals to Po/S. If the efficiency is fixed at a specific level (meaning the efficiency is kept the same), the following relationship between the power pressure (Pp) and the height (H) could be derived: the greater the H, the greater the Pp. In other words, to improve Pp, we should focus on the utilization of the height (H) for a solution. Of course, if the goal is to pursue the efficiency, the height should be properly utilized based on the foregoing rationale. Therefore, how to utilize the height is the key to address both the power pressure (Pp) and the efficiency.

The thickness or height of the main board power supply can be as thin as 7 mm or even less; hence, when the height of the server is limited to, say 1U, there are more than 20 mm of space height above the power. In this case, the efficiency can be 90% or higher, since the power consumption thereof is only a fraction (such as 10%) of the data processing chip, in fact, it is possible for it to handle the heat dissipation issue without using a heat dissipation unit. In this way, the space above the main board power supply is not adequately utilized.

Generally, there two ways to manufacture the main board power supply. The first one uses a PCB as the bearer on which individual components are installed. After years of efforts, this type of main board power supply achieves satisfactory efficiency and power density. Yet, since the components are individually installed, there should be necessary space or safety distance between components, thereby limiting the further size reduction of the horizontal area; also, the uneven height would affect the subsequent handling of the heat.

The other way to manufacture the main board power supply is to use certain packaging technique to integrate each components of the power supply into a quite regular element. By using such packaging techniques, the power density is significantly increased with satisfactory efficiency; also, such regular shape is advantageous for the subsequent handling of the heat; thereby providing an appropriate solution. However, said packaging technique realize the volume reduction and power density improvement by lowering the height of the main board power supply, and hence, it focuses on decreasing the height based on the original horizontal area. Therefore, this solution is only one of the solution for pursuing a better power density; however, it cannot adequately address the improvement regarding the power pressure of the main board power supply.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

The present invention addresses the deficiency of the prior art and provides a novel solution that deals with both the power pressure and the efficiency; it is suitable for use in application settings requiring a larger horizontal area; such as the demand for power supply in data processing settings like the data center.

In one embodiment, a power supply apparatus includes a power unit electrically connected with a motherboard, comprising a first base plate, at least a power switch chip allocated at the first base plate and a plurality of pads; a control unit stacked with the power unit, comprising a second base plate and at least a control chip for controlling the power switch chip turn on/off in the power unit and a plurality of pads; a plurality of pins for electrically connecting the power unit to the control unit and mother board and allocated at periphery of the power unit and control unit, wherein the plurality of pads of the power unit and control unit are allocated on side facet of the first base plate and second base plate respectively, both plurality of pads of the power unit and control unit are electrically connected with the plurality of pins so that the power unit and the control unit could electrically connected with each other, the power supply apparatus provides a power source for a load in the neighborhood thereof on the motherboard.

In one embodiment, a power supply apparatus includes a first stage power converter received a power source from a mother board and configured with a plurality of pads located on side facet thereof; a second stage power converter configured with a plurality of pads located on side facet thereof and stacked with the first stage power converter to receive an output of the first stage power converter to provide a power to a load in adjacent area thereof on the motherboard; and a plurality of pins connected with the pads of the first or/and second stage power converter and the motherboard to realize the electrical connection therebetween.

In one embodiment, a power supply apparatus includes a first unit electrically connected with a motherboard, comprising a first base plate, at least a power switch chip allocated at the first base plate and a plurality of pads; a second unit stacked with the first unit, having a plurality of connection pads for electrical connection; and a plurality of pins for electrically connecting the first unit to the second unit and mother board and allocated at periphery of the first unit, wherein the plurality of pads of the first unit are allocated on side facet of the first base plate, both plurality of pads of the first unit and plurality of connection pads of the second unit are electrically connected with the plurality of pins so that the first unit and the second unit could electrically connected with each other, the power supply apparatus provides a power source for a load in the neighborhood thereof on the motherboard.

In view of the foregoing, the technical solutions of the present disclosure result in significant advantageous and beneficial effects, compared with existing techniques. The implementation of the above-mentioned technical solutions achieves substantial technical improvements and provides utility that is widely applicable in the industry. The present disclosure provides a stack structure so that the height of the power supply can be properly utilize; when the volume is fixed, it is possible to achieve a smaller floor space; meanwhile, it retains sufficient volume to ensure a higher efficiency, thereby addressing both the high power pressure and high efficiency. Also, it supports the data processing apparatus with better performances.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein.

DETAILED DESCRIPTION

Figure 1:
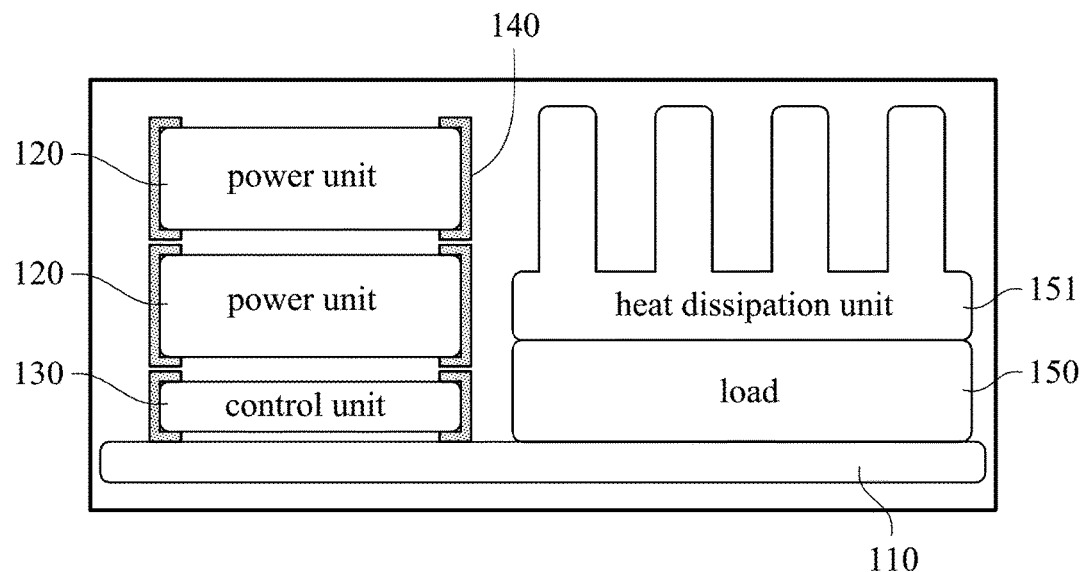
FIG. 1 is a lateral view illustrating a power supply apparatus according to one embodiment of the present disclosure.

In the following detailed description, for purposes of explanation, numerous specific details are set forth in order to attain a thorough understanding of the disclosed embodiments. In accordance with common practice, like reference numerals and designations in the various drawings are used to indicate like elements/parts. Moreover, well-known elements or method steps are schematically shown or omitted in order to simplify the drawing and to avoid unnecessary limitation to the claimed invention.

In the detailed description and appended claims, the term "coupled with" applies generally to that one component is indirectly connected to another component via other component(s), or one component is directly connected to another component without any other component.

On technical aspect of the present invention is a power supply apparatus, which can be used in a server or more generally in various technical fields. It should be noted that the power supply apparatus according to this aspect uses the stack structure, and therefore, the height of the power supply can be properly utilized so that a smaller floor space can be realized when the volume is fixed.

FIG. 1 is a lateral view illustrating a power supply apparatus according to one embodiment of the present disclosure. As illustrated in FIG. 1, the power supply application device (e.g., a power supply apparatus) comprises a main board 110, a power unit 120, a control unit 130, and a pin 140. The main board 110 further has a load 150 disposed thereon; the power unit 120 is disposed on the main board 110; the control unit 130 and the power unit 120 are stacked on the main board 110 at a position in adjacent to the load 150; the pin 140 is electrically coupled to the main board 110, the control unit 130, and the power unit 120; in the present embodiment, there are multiple pins 140 and these pins are respectfully disposed on a lateral side of each of the power unit 120 and the control unit 130; the two power units 120 and the control unit 130 are stacked with one another on the main board 110. The control unit 130 is configured to control the power unit 120; specifically, the control unit controls the two power units 120 via the pins 140, so that the power unit 120 supply the electricity to the adjacent load 150. The load 150 is a digital processing IC, such as a central processing unit (CPU), and the CPU has a heat dissipation unit/heat dissipation device such as a heat dissipator 151 disposed thereon. The power unit 120 comprises at least one power semiconductor device (such as, switch tubes S21, S22, S23, S24 in FIG. 3, switch tubes S21, S22, S23, S24, S31, S32, S33 in FIG. 11); the control unit 130 comprises at least one chip having the control or driving ability (such as, the control circuit 310 in FIG. 3, the control circuit 1100 in FIG. 11, DSP).

In one embodiment, the power supply apparatus is disposed on the main board 110; the main board 110 further has a load 150 of a data processing chip (such as, CPU) disposed thereon; the power supply apparatus comprises: the power unit 120, the control unit 130 and pins 140. The control unit 130 and the power unit 120 are stacked on the main board at a position in adjacent to the load 150; the pins are electrically coupled to the main board 110, the control unit 130 and the power unit 120; the control unit 130 is configured to control the power unit 120, so that the power unit 120 supplies the electricity to the adjacent load 150.

In sum, the DC/DC power supply comprises at least two units (i.e., modules): the control unit 130 and the power unit 120. Said two modules are vertically stacked, and the electric connection therebetween is realized via the conductors (i.e., pins 140) so as to transmit the electric signal. The power unit 120 comprises at least one active switching element; the power unit 120 receives the input power and generates a corresponding output power by the conduction and turning-off of the active switching element and then supplies the output power to the load 150, such as the data processing chip. The control unit module 130 comprises at least one control chip for sending a control signal to the active switching element of the power unit 120 so as to control the conduction and turning-off of said element. The unit disposed at the upper position and a portion of the pins are fixed by the unit disposed at the lower position, and then transmits the electric signal to the above-mentioned main board 110 (such as, the PCB).

In this way, due to the stack structure adopted herein, the height of the power supply can be more properly utilized so as to realize a smaller floor space at a given volume; while retaining sufficient volume to ensure a higher efficiency; accordingly, it accomplishes both the high power pressure and high efficiency. Also, it supports the data processing apparatus with better performances.

Infrastructure and Distribution of Stack Component of the Power Supply

Figure 2:
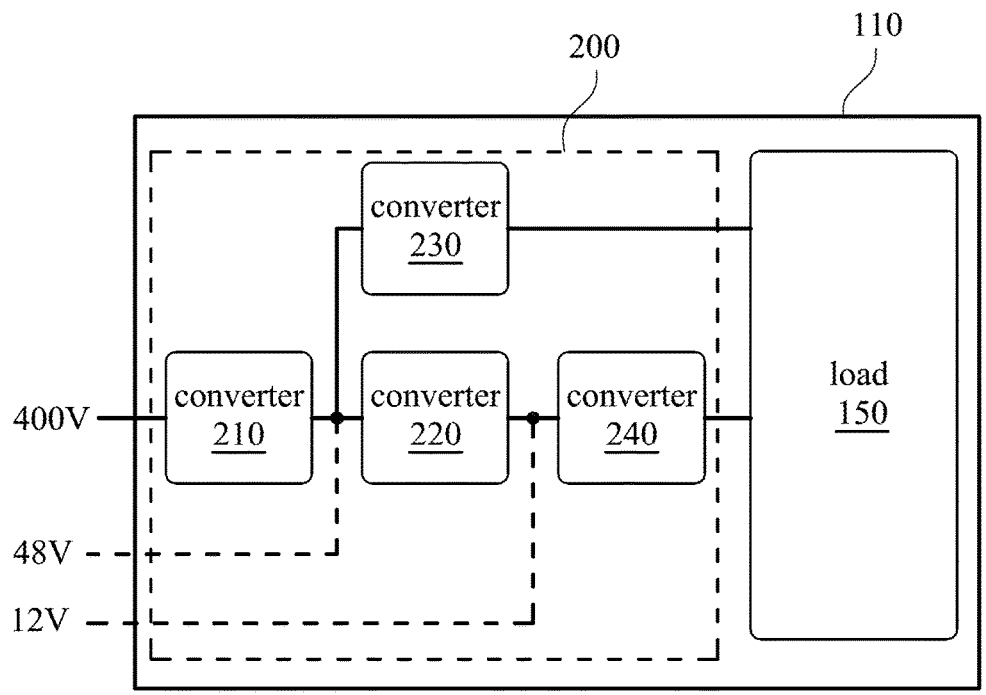
FIG. 2 to FIG. 14 illustrate the infrastructure and distribution of stack component of the power supply according to embodiments of the present disclosure.

FIG. 2 is a schematic diagram illustrating various types of power supply converter (i.e., the main board power supply 200) that may involve in a server main board. The input of the power supply converter is often a direct current with a wide range of voltage, including high voltage of 200 to 500 V (for example, 400 V), middle voltage of 18 to 72 V (for example, 48 V) and low voltage of 5 to 15 V (for example, 12 V). No matter what kind of voltage is being inputted, a corresponding DC/DC converter is required to convert the input into a desired output to be supplied to the load 150, such as the data processing chip, like a central processing unit (CPU) and memory. The variation range of the output is also wide so as to adapt to the demands of various loads; for example, the output can be as low as 0.8 V or even lower, or as high as 12 V or even higher. When the load 150 is a CPU and memory, the output voltage is often in the range of 0.8 to 2 V. Therefore, the power supply specification involved includes, mainly:

(1) Converter 210 converts 400 V to 48 V: the input voltage is in a range of 200 to 500 V (for example, 400 V) which is outputted as a stable output voltage or at a fixed ratio to the input voltage; for example, the output voltage can be around 48 V or a voltage un the range of 18 V to 72 V. Since the output voltage is higher, it will not be directly connected to the data processing chip load; instead, another specification converter should be cascaded thereafter to adjust the voltage to a level that can be used by the load.

(2) Another a converter (not shown in the drawing) coverts 400 V to 12 V: the input voltage is in a range of 200 to 500 V (for example, 400 V) which is outputted as a stable output voltage or at a fixed ratio to the input voltage; for example, the output voltage can be around 12 V. Since the output voltage is lower, it can be connected to some data processing loads, such as a hard drive. However, when the load voltage is even lower; for example, 0.5 to 5 V, another specification DC/DC converter should be cascaded thereafter to adjust the voltage to a level that can be used by the load.

(3) Yet another converter (not shown in the drawing) converts 400 V to 0.5 to 5 V: the input voltage is in a range of 200 to 500 V (for example, 400 V) which is outputted as a stable output voltage depending on the actual need; for example, the output voltage is in the range of 0.5 to 5 V. The output voltage can be directly connected to the data processing chip, such as the CPU, memory, etc.

The converts according to the above-mentioned specification (1) to (3) use a high-voltage input, and hence, they should meet the requirements for high voltage safety insulation, and the insulation voltage should be around a DC voltage of 2000 V, or even higher.

(4) Converter 220 converts 48 V to 12 V: the input voltage is in a range of 18 to 72 V (for example, 48 V), which is outputted as a stable output voltage or at a fixed ratio to the input voltage; for example, the output voltage can be around 12 V, or in the range of 3 to 15 V. The converter of this specification can be directly connected to some data processing loads, such as a hard drive.

(5) Converter 230 converts 48 V to 0.5 to 5 V: the input voltage is in a range of 18 to 72 V (for example, 48 V) which is outputted as a stable output voltage depending on the actual need; for example, the output voltage is in the range of 0.5 to 5 V. The output voltage can be directly connected to the data processing chip, such as the CPU, memory, etc.

(6) Converter 240 converts 12 V to 0.5 to 5 V: the input voltage is in a range of 3 V to 15 V (for example, 12 V) which is outputted as a stable output voltage depending on the actual need; for example, the output voltage is in the range of 0.5 to 5 V. The output voltage can be directly connected to the data processing chip, such as the CPU, memory, etc. Since this converter uses the low-voltage input, there is no need for insulation, and the output can be directly connected to the data processing chip, such as the CPU, memory, etc.

The converts according to the above-mentioned specification (4) to (6) use a low-voltage input, and hence, the voltage-bearing demand of the converters is lower, which is generally less than a DC voltage of 2000 V.

When the output of the converter is 0.5 to 5 V, since the output can be directly connected to the load 150, such as the data processing chip, the power supply converter is required to output a low-voltage high current, and a high dynamic responsive ability is required, for example, when the load 150 is a CPU, a responsive ability of 1000 A/ns is required; and in this case, the power supply converter should be disposed in adjacent to the load. Therefore, such power supplies are referred to as the "point of the load". Among them, the power supply for supplying the CPU (also known as the voltage regulated module (VRM)) is required to supply the electricity from an adjacent position.

The power supply converters having the above-mentioned input/output specifications are all disposed on the main board; hence, they can be stacked to achieve the goals of high power pressure and high efficiency. Of course, the combination of various converters is also appropriate for the stack arrangement.

As described above, the power supply having an input of 400 V or 48V often requires an input/output safety pressure tolerance due to the greater pressure difference between the input and output, and it often uses a transformer to isolate and transmit the energy. Of course, if necessary, for example, to realize a wider input or output range, a low-voltage input power supply (such as a power supply having an input of 12 V) can also use a transformer to transmit the energy.

The converters according to the above-mentioned specifications can employ various type of topology to achieve the conversion of the electric energy, for example, the pulse-width modulation (PWM)-based forward circuit, full-bridge circuit, phase-shift full-bridge circuit, half-bridge circuit, fly-back circuit, etc. To realize a higher power density, a higher operation frequency is often required, for example, 500 kHZ, 1 MHZ, or even more than 2 MHZ. To achieve a high efficiency under such high frequency, a resonant circuit (that is, a pulse-frequency modulation (PFM)-type LLC series resonant converter (LLC-SRC), parallel resonant converter (PRC), etc.) is often selected.

Figure 3:
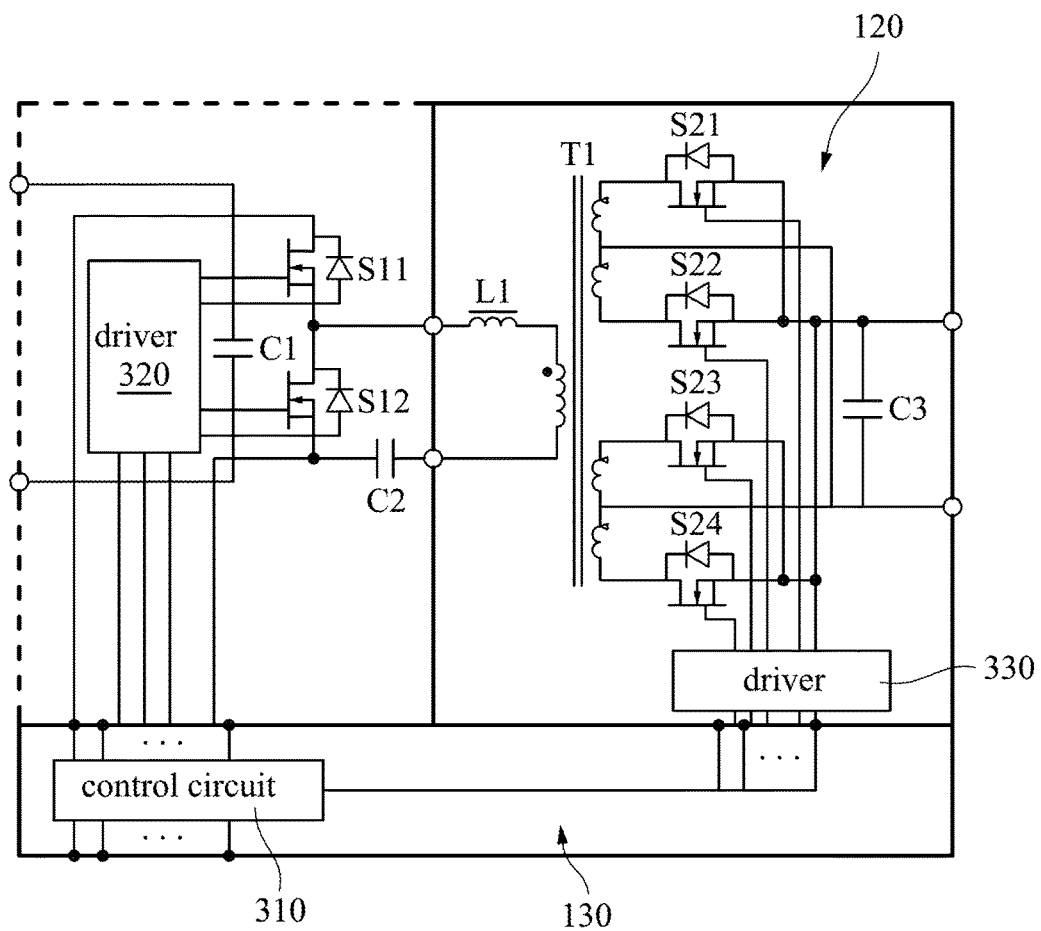

FIG. 3 illustrates a half-bridge LLC circuit. As illustrated in FIG. 3, the circuit comprises a main circuit and a control circuit 310. The main circuit comprises: an input capacitor C1, a resonant capacitor C2, a resonant inductor L1, a transformer T1, primary side switch tubes S11, S12 and secondary side switch tubes S21, S22, S23, S24, wherein the input capacitor C1 is connected with the primary side switch tubes S11, S12; the primary side switch tubes 311, S12 is connected with a series circuit composed of the resonant capacitor C2, the resonant inductor L1, the primary winding of the transformer T1; the secondary winding of the transformer T1 is connected with the secondary side switch tubes S21, S22, S23, 324; the output capacitor C3 is connected with the secondary side switch tubes S21, S22, S23, S24. The primary side switch tubes S11, S12 receive the input power and convert the DC input signal into a AC signal; the AC signal is transmitted to the secondary side via the resonant inductor L1, the resonant capacitor C2 and the transformer T1, and then passed through the secondary side synchronous rectifying circuit (such as, the secondary side switch tubes S21, S22, S23, S24), and generates an output voltage on the output capacitor C3 and supplies the output power to the load. It should be noted that since the output is a low-voltage high current, to reduce the loss, the elements with low-voltage high current (such as the T1 secondary winding, the secondary rectifier, the output capacitor) are often in parallel connection to obtain a low resistance. For example, "an assembly of a rectifying assembly S21, S22 and a secondary winding" and "an assembly of another rectifying assembly S23, S24 and another secondary winding" are in parallel connection. Since the output voltage may vary, the structure of the transformer secondary winding is not limited to the central tap rectifying structure illustrated in FIG. 3; rather, it could be any other structure such as the full-bridge rectifying structure.

The control circuit 310 generates a control signal that is supplied to the driver 320 for driving the primary side switch tubes S11, S12, and the driver 330 for driving the secondary side switch tubes S21 to S24, so as to control the conduction or turning-off of each switch element (e.g., switch tubes 311, S12, S21 to S24) in the main circuit. Of course, the control circuit 310 may further comprise other elements necessary for sampling, protection and communication; these elements or not illustrated in the drawing, and hence will not be discussed in detail herein.

Since the power unit 120 is under the high-frequency operating status, and the output of the converter is a low-voltage high current, generally, the circuit composed of the secondary side of the transformer, the output synchronous rectifying circuit and the output capacitor should be as small as possible so as to adapt for the need of the high frequency. Therefore, the transformer T1, the synchronous rectifying circuit (i.e., secondary side switch tubes S21, S22 等), the output capacitor C3 have to be disposed in a single unit circuit (i.e., the power unit 120).

In one embodiment, the maximum operating voltage of the power supply input is greater than 20 V, the power unit 120 comprises: at least one transformer T1, in which the transformer T1 comprises at least one primary side and at least one secondary side; at least one synchronous rectifying assembly (such as, the secondary side switch tubes S21, S22) and an output capacitor assembly (such as, the output capacitor C3). The high frequency energy id delivered from the primary side to the secondary side, and rectified by the synchronous rectifying assembly into a direct current, which is then transmitted to the output capacitor for integration.

On the other hand, the peripheral of the control circuit 310 often comprises many peripheral circuits, and the signal required to be processed is low, and hence, they should be placed in proximity to increase the anti-interference ability. Therefore, the control circuit 310 and the peripheral circuits thereof should be placed in a single unit circuit (i.e., the control unit 130). In one embodiment, the control unit 130 is implemented by an embedding technique and the thickness thereof is less than 2 mm. The power unit (e.g., power supply converting circuit) is a resonant circuit with an operating frequency greater than 1 MHZ. The control unit (e.g., control power supply) has an input filter stacked thereabove.

Regarding the driver 320, 330, the primary side switch tubes S11 to S12, the resonant capacitor C2, and the resonant inductor L1 can be disposed in the power unit 120 or the control unit 130 depending on the actual needs. The input capacitor C1 can inhibit the voltage peak of the primary side switch tubes S11 to S12, and accordingly, it should be preferably disposed with the primary side switch tubes S11, S12 in a single unit. The L1/C2 can be obtained by integrating with other elements such as the T1. Moreover, the T1 exciter inductor can be an individual inductor that in parallel connection with the transformer primary, so as to facilitate the optimization of the performance of the T1.

As illustrated in FIG. 1, the overall power circuit is formed by stacking the control unit 130 and the power unit 120, which will effectively reduce the horizontal area of the power circuit 120; and hence, when the power circuit is placed on the main board 110, the space that it occupies on the main board 110 is reduced. In FIG. 1, the control unit 130 or the power unit 120 can be manufactured by a packaging technique, e.g., using a plastic material in a molding process, so as to form a module. Alternatively, the two units can be manufactured as individual elements. Either way, each unit may comprise a bearing plate, such as, the printed circuit board (PCB) or the direct bonding circuit (DBC), etc., for bearing the components of the unit; alternatively, the components can be directly stacked within the unit, for example, the switch element and elements such as the inductor and the capacitor can be directly stacked with one another. When the primary side switch tubes S11 to S12, the resonant capacitor C2, the resonant inductor L1 are integrated in the power unit, the circuit in the control unit mainly handles the control signal, and hence, the height of the control unit can be very small, such as less than 5 mm, 3 mm, or even 1 mm.

Figure 4:
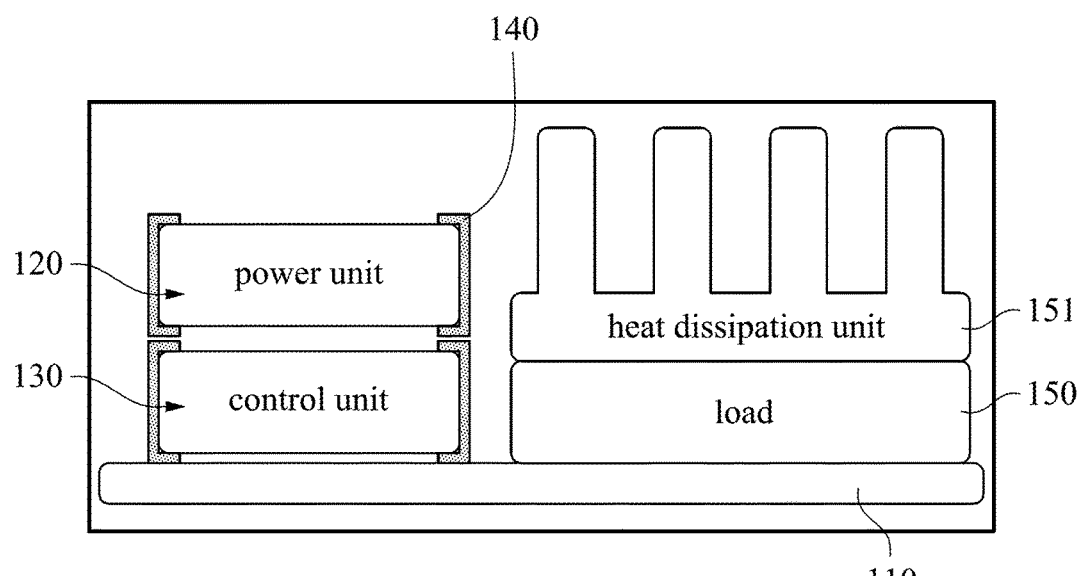

In the case where the size of the power is bigger, it is possible to connect several main circuits illustrated in FIG. 3 using the parallel connection of the input/output. In this way, the overall structure of the power supply apparatus can use one main circuit as a power unit, and stacks several identical power units and a control unit, as illustrated in FIG. 1. The control unit 130 can be disposed at the lower position with two power units 120 stacking thereon, or the control unit can be sandwiched between two power units, or the control unit can be placed above the two power units. Either way, the structure takes full advantage of the height so as to achieve the goal of increasing the power without changing the floor space. In this embodiment, the number of the control unit 130 can be one, and it is configured to control the conduction and turning-off of the switch elements of the two power units 120; or there can be multiple control units, for example, two, for respectively controlling the conduction and turning-off of the switch elements of the two power units. Of course, it is possible to integrate the control unit and one of the power units, so that at least one power unit 120 and one control unit 130 are stacked together, in which the control unit is integrated from at least one main circuit. As illustrated in FIG. 4. The power supply module comprises the power unit 120 and the control unit 130 that are stacked together and are electrically connected via the pins 140. In this embodiment, the power unit 120 is integrated from an DC/DC converter, and the control unit 130 is integrated from another DC/DC converter and a control circuit, in which the control circuit controls said two DC/DC converter.

As discussed above, the power supply apparatus receives an input, generates an output and provides the energy to the load. The power supply apparatus may use the single-stage converter, such as the circuit illustrated in FIG. 3, to achieve the requirement for voltage conversion, or even isolation. Of course, multiple-stage converter can be used. Due to the limitation of the characteristics of the component, usually, the single-stage circuit is not suitable for wide-range input/output; hence, for a load with a wide voltage range, such as the CPU, memory and other loads applied in the server power supply, it is more appropriate to use a two-stage power supply; in this case, one of the which is responsible for isolation, while another one is responsible for voltage adjustment; each responsible for its own function so as to achieve the optimal performance. For example, structure like this is illustrated in FIG. 5 or FIG. 6.

Figure 5:
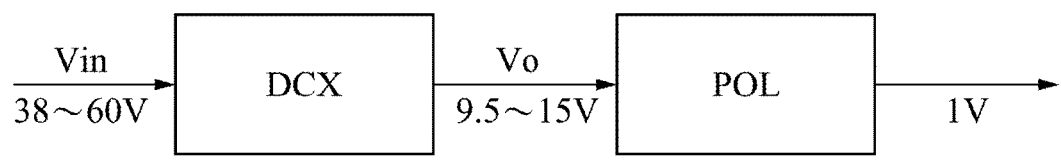
Figure 6:
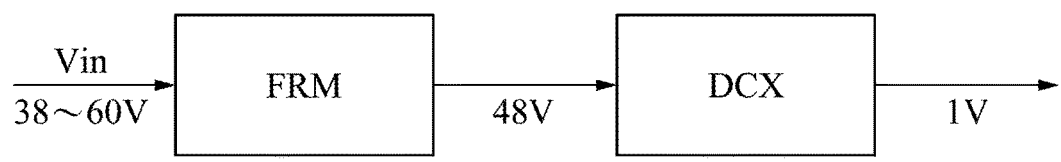

As illustrated in FIG. 5, the input voltage Vin is a wide voltage range, such as 38 to 60 V, the input voltage uses a front-stage circuit (such as an isolated non-regulated DC/DC converter; i.e., an isolated transforming module DCX; as used herein, the term "non-regulated" means that the input/output of a circuit in the operating range is fixed at a constant ratio; that is, the output varies in proportion to the input, such as Vin/Vo=n; for example, in FIG. 5, Vin/Vo=4) to achieve high-voltage isolation; and then uses a post-stage circuit (such as a non-isolated regulated DC/DC converter) to provide the output to the load. For example, the post-stage circuit could be a point-of-load (POL) converting unit that could be used to fulfill the needs for outputting stabilized voltage and dynamic response. Since the post-stage circuit has the adjusting capability, and therefore, the front-stage circuit doesn't need to have the adjusting capability. However, if needed the front-stage circuit may have the full or partial adjusting capability; for example, the front-stage circuit can be an isolated DC/DC converter.

Referring to both FIG. 1 and FIG. 5, the two power units 120 can respectively be a power unit of the primary DC/DC converter and the power unit of the secondary DC/DC converter; the control unit 130 comprises the control unit of the primary DC/DC converter and the control unit of the secondary DC/DC converter. Specifically, the primary DC/DC converter is an isolated DC/DC converter; secondary DC/DC converter is a non-isolated regulated DC/DC converter (such as the one illustrated in FIG. 5), the non-isolated regulated DC/DC converter is closer to the main board 110 than the isolated DC/DC converter is. Alternatively, the primary DC/DC converter is a non-isolated regulated DC/DC converter; the secondary DC/DC converter is an isolated non-regulated DC/DC converter. For example, the primary DC/DC converter is a buck-boost circuit.

In one embodiment, the power unit 120 is a primary DC/DC converter; the control unit 130 is a power unit of a secondary DC/DC converter. For example, the primary DC/DC converter is a non-isolated regulated converter; the secondary DC/DC converter is a non-regulated isolated converter; or, the primary DC/DC converter is an isolated converter; the secondary DC/DC converter is a non-isolated regulated converter.

Since the front-stage circuit is a non-regulated isolated transforming module DCX, it is possible to design it so that the circuit operates at the optimal operating point, thereby making the circuit relatively simple with a high efficiency. When the isolated transforming module DCX is a resonant circuit, the isolated transforming module DCX may operate around the resonant frequency; and when the DC transformer DCX is a PWM circuit, such as a full-bridge circuit, it can operate under the condition with the greatest mark-space ratio. The post-stage circuit is a regulated circuit, such as a point-of-load (POL) DC converter which is usually implemented by a buck circuit (such as, POL buck DC converter), so that the characteristics of the output fulfills the requirement of the load; in this case, the circuit is simple, and the output voltage range is quite wide. Combining the two, it will be easy to achieve the requirements of wide input/output voltage range, high output voltage accuracy, and dynamic response property. When the isolated transforming module DCX uses the resonant circuit, such as the LLC-SRC circuit, it is easier to achieve a power supply with high efficiency and high power density under high frequency. Of course, since the post-stage circuit has the regulation capability, if the DCX reduces the voltage-withstand value of the intermediate BUS capacitor and associated power component, due to certain reason, such as the reduction of the intermediate BUS voltage range, so that the DCX has certain level of output voltage regulation capability, it will not affect the implementation and function of the present invention.

As illustrated in FIG. 6, the input voltage Vin is a wide voltage range, such as 38 to 60 V. The input voltage Vin uses a front-stage circuit (such as a non-isolated regulated DC converter; i.e., a front regulate module (FRM)) to convert the input voltage into a desired value, such as a constant voltage of 48V, and to respond to the dynamic change of the load; and an isolated non-regulated DC converter (i.e., an isolated transforming module DCX) is connected thereafter in parallel connection to achieve the voltage isolation, and the requirement for bucking. Under this structure, the stabilized voltage and dynamic response of the final output (i.e., the output of the post-stage circuit) are implemented by the front-stage circuit. Since the front regulate module (FRM) does not require isolation, it could be implemented with various topologies, such as, buck, boost or buck-boost circuit; for high frequency application, it is possible to implement the soft switching technique. Therefore, the front regulate module (FRM) may have a very high power density, and so does the isolated transforming module DCX.

Referring to both FIG. 1 and FIG. 6, one power unit 120 of the two power units 120 comprises the power unit of the primary DC/DC converter and the power unit of the secondary DC/DC converter; the primary DC/DC converter is an isolated non-regulated DC/DC converter, while the secondary DC/DC converter is a non-isolated regulated DC converter (as illustrated in FIG. 6).

Figure 7:
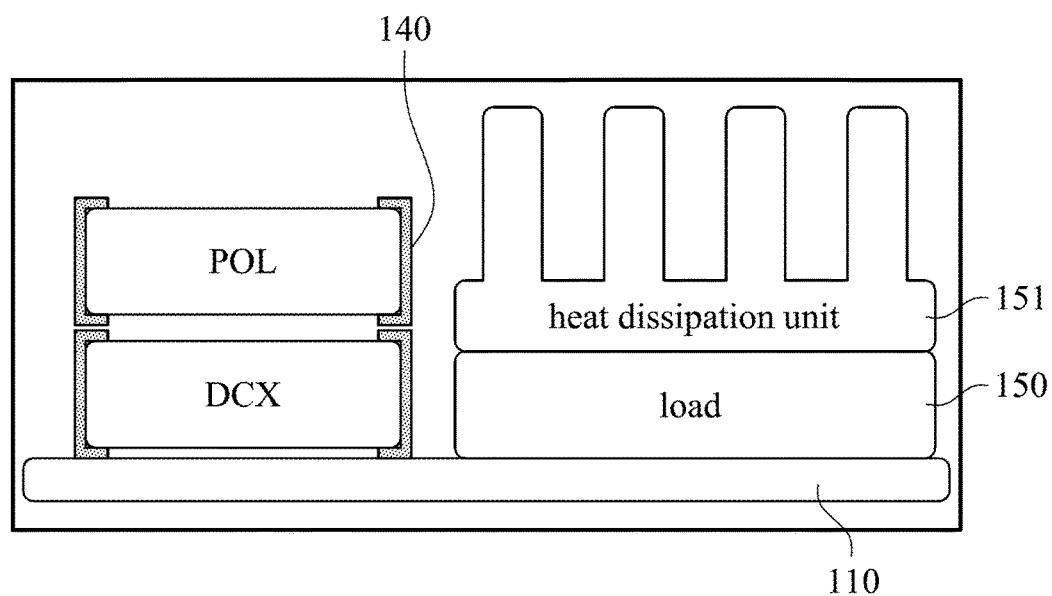
Figure 8:
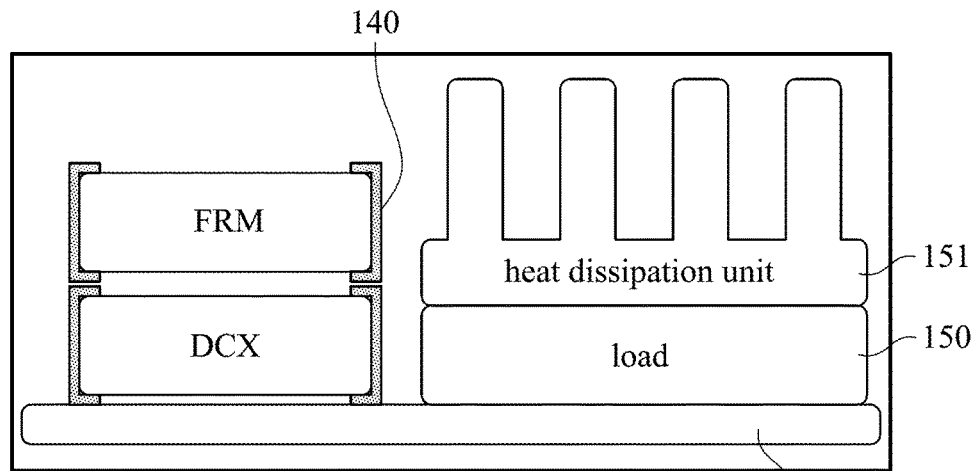

Using the above-discussed two power supply structures, take main board power supply with the output power of 200 W as an example, it is possible to implement the isolated transforming module DCX and point-of-load (POL) DC converter (the structure of FIG. 5) or the front regulate module (FRM) and isolated transforming module DCX (the structure of FIG. 6) within a floor space of 1/16 brick (1.3 in*0.9 in, or 33 mm*22.9 mm); therefore, the power pressure is 85.5 W/inch$^2$ (in fact, due to the installation space required between two units, the power pressure is even lower). Since the height of the two units is less than 10 mm or even 7 mm, if the two units are stacked according to the method provided by the present disclosure (as illustrated in FIG. 7), the control unit and the power unit are integrated as an isolated transforming module DCX which is stacked with the point-of-load (POL) DC converter on the main board 110; or, as illustrated in FIG. 8, the control unit and the power unit are integrated as a front regulate module (FRM) which is stacked with an isolated transforming module DCX on the main board 110. In this way, the power pressure can be immediately doubled to 171 W/inch$^2$, thereby greatly reducing the required space on the main board. Even though the stacking may require some additional height for reasons such as heat dissipation, the overall height thereof can be less than 25 mm, which fully complies with the requirement for the height of the server (which could be as high as 30 mm).

Figure 9:
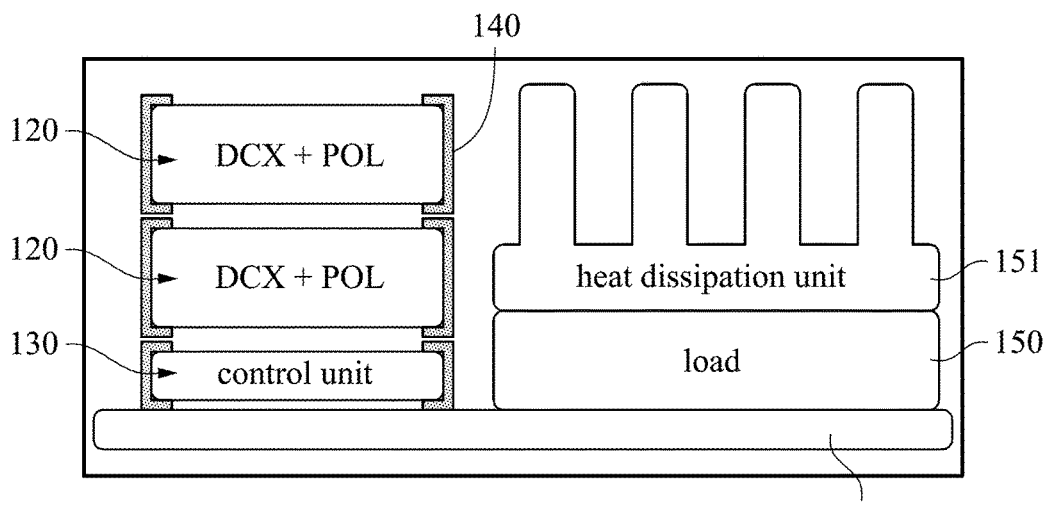

To reduce the volume occupied by the pins for interconnection, the power stages of the above-mentioned isolated transforming module DCX and point-of-load (POL) DC converter can be manufactured in a single power unit 120, and the control circuits of two stages are manufactured in a single control unit 130. In this way, the handle of the power parts can be centralized, so as to achieve a better efficiency and smaller floor space. Depending on actual needs, said power unit part, can be one parts or multiple parts in parallel connection, as illustrated in FIG. 9; multiple power units 120 are in parallel connection and each comprises the power stages of an isolated transforming module DCX and point-of-load (POL) DC converter, the control unit 130 comprises the control circuits of the isolated transforming module DCX and point-of-load (POL) DC converter.

Figure 11:
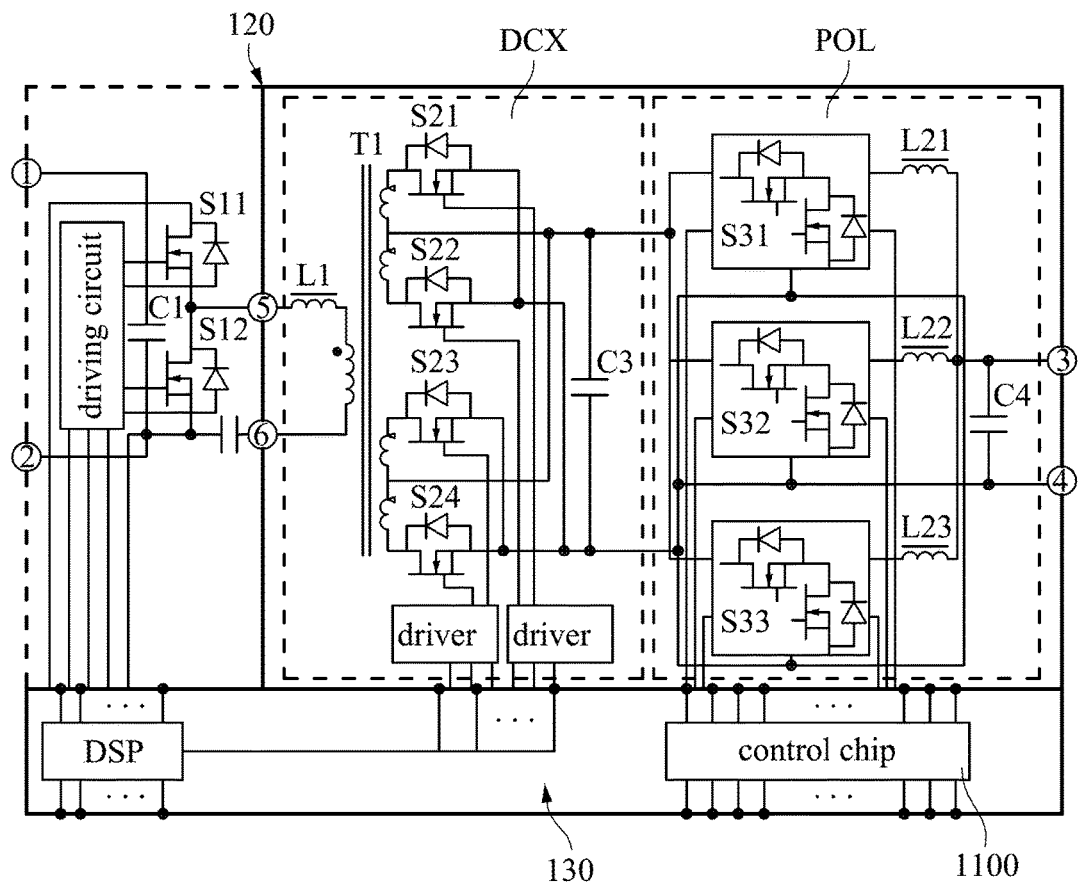

FIG. 11 illustrates the principle of the circuit structure of FIG. 5. FIG. 11 differs from FIG. 3 in that it has an additional post-stage circuit—the circuit of the circuit point-of-load (POL) DC converter, such as the buck circuit illustrated in FIG. 11, in addition to the parts illustrated FIG. 3. Since the output is a low-voltage high current, the POL is usually implemented using several buck circuits in parallel connection. The specific number of the circuits in parallel connection depends on the actual condition. For example, in FIG. 11, there buck circuits are in parallel connection. The isolated non-regulated DC/DC converter comprises: an isolated transformer T1, a plurality of primary switch tube S11, S12 and a plurality of secondary switch tubes S21, S22; the non-isolated regulated DC converter is a point-of-load (POL) DC converter. The circuit of each point-of-load (POL) DC converter respectively comprises the switch tubes S31, S32 and S33 and filtering inductors L21, L22 and L23 and connected with the switch circuits, which form the corresponding buck circuit. The output of the circuit in each point-of-load (POL) DC converter is in parallel connection with the two terminals of the capacitor C4, so as to generate the output power and provided the same to the load. The control chip 1100 is configured to generate the control signal for controlling the conduction and turning-off of the switch elements in the point-of-load (POL) DC converter. To achieve a high efficiency, the power unit 120 comprises the isolated transformer T1, the synchronous rectifying switch tubes S21 to S24, and the output capacitor C3 of the isolated transforming module DCX, and the switch tubes S31 to S33 of the point-of-load (POL) DC converter. In other words, the isolated transformer T1, the secondary switch tubes S21, S22, S23, S24, the output capacitor C3 for isolating the DC/DC converter, and the point-of-load (POL) DC converter are disposed within a single power unit 120. Of course, the structure in FIG. 11 further comprises the filtering inductors L21 to L23 and the output capacitor C4. The control unit 130 comprises a control chip 1100 and the peripheral circuit thereof, such as the signal processor DSP illustrated in FIG. 11 and the peripheral circuit of the controller (not shown). The primary switch tubes S11, S12 are disposed in the control unit 130, and the control unit 130 further comprises the primary switch tube driving circuit, the control driving circuit of the POL DC converter, and the control chip 1100.

Figure 10:
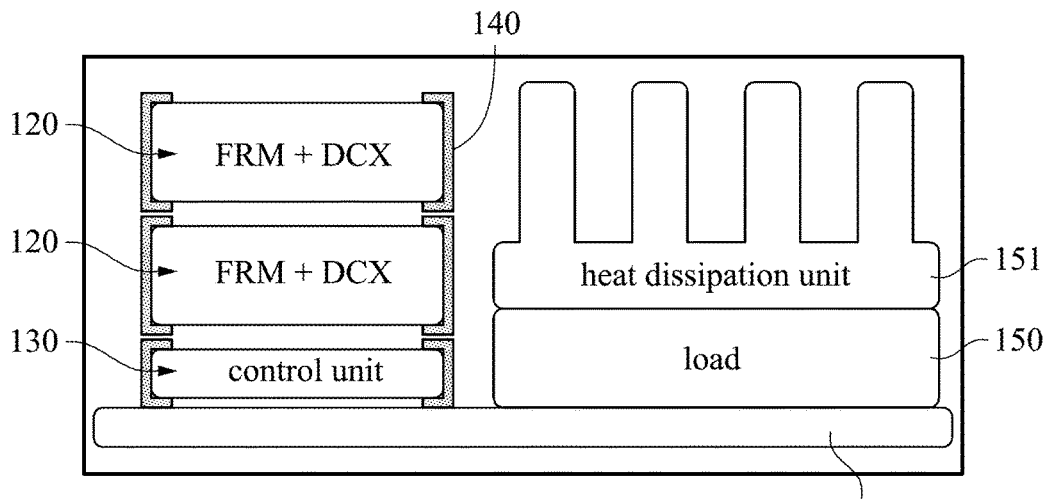

The structure for the front regulate module (FRM) and isolated transforming module DCX can also be implemented in this way, so as to achieve both the higher efficiency and higher power pressure; as illustrated in FIG. 10, multiple power units 120 are in parallel connection, and each of which comprises the power stages of the front regulate module (FRM) and the isolated transforming module DCX; the control unit 130 comprises the control circuits of the front regulate module (FRM) and the isolated transforming module DCX.

Of course, the above-mentioned isolated transforming module DCX can also be a regulated converter or semi-regulated converter. The variation in function will not affect its contribution to the improvement of the efficiency and the power pressure.

Figure 12:
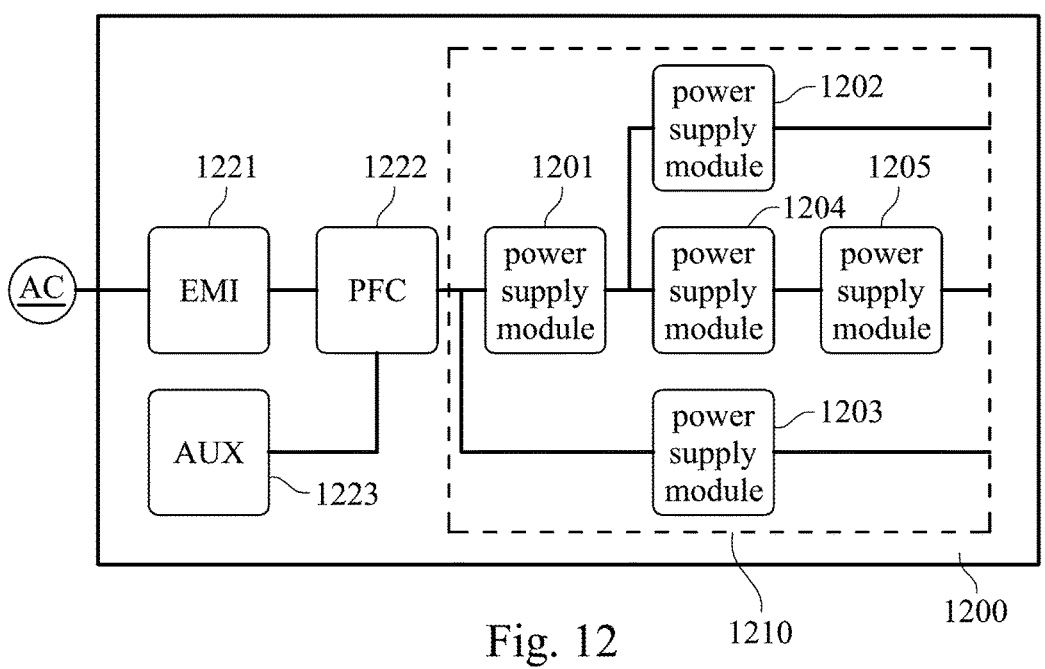

In the above embodiments, all of the power supplies use the DC to DC (DC/DC) converter. These embodiments can be applied in structures such as where the DC power supply directly inputs to the server main board. Of course, with the advancement of the technology, there might be the case where the AC power supply AC directly inputs to the server main board 1200. As illustrated in FIG. 12, the AC power supply AC (such as 220 Vin) directly connects to the server main board 1200, and provides the input power to the corresponding load through the main board power supply 1210 composed of cascaded or parallel-connected power supply modules 1201 to 1205. In comparison to the above-mentioned main board power supply of the DC input, this structure further comprises front-stage cascaded electromagnetic interference (EMI) filter 1221, the power factor correction (PFC) circuit 1222 and the auxiliary power module 1223, etc. In this structure, the above-mentioned stacking techniques can also be used.

Figure 13:
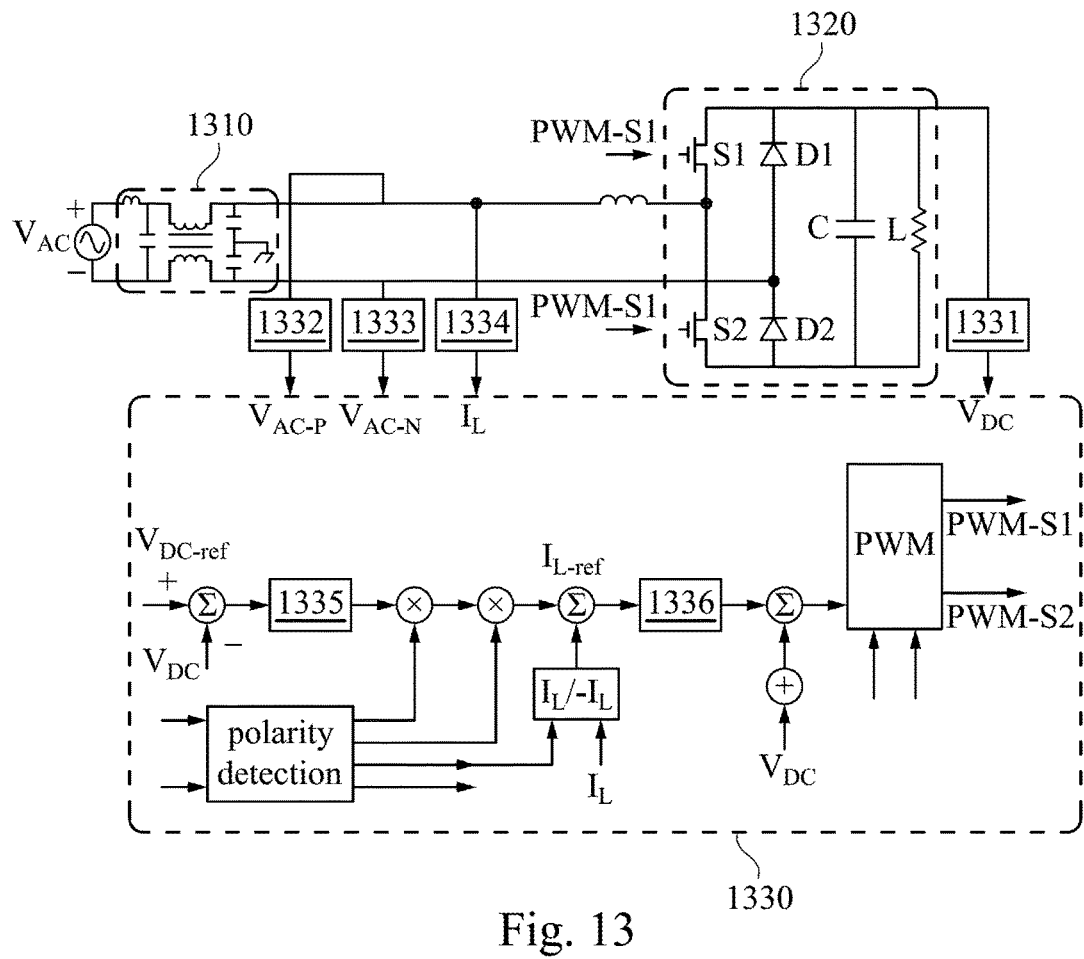

FIG. 13 is a schematic diagram illustrating a EMI filter 1310 cascaded with a post-stage PFC circuit 1320. As illustrated in FIG. 13, after the EMI filter 1310 receives the AC input, e.g., $V_{AC}$=220 V, it provides an output signal to the post-stage cascaded PFC circuit for power factor correction. In practice, the PFC circuit 1320 can be implemented in various topologies, such as the boost, buck, dual-boost and the totem pole structure illustrated in FIG. 13. Take the totem pole PFC circuit illustrated in FIG. 13 as an example, the main circuit in the PFC circuit 1320 comprises a high frequency capacitor C, a PFC inductor L and power switch devices (that is, a first bridge-arm composed of serially connected active switching elements S1, S2, and a second bridge-arm composed of serially connected passive switch elements D1, D2). The first and second bridge-arms and the high frequency capacitor C are in parallel connection; the power switch devices and the high frequency capacitor C are electrically coupled to the PFC inductor L; two middle points of the two bridge-arms are respectively connected with the output of the EMI filter 1310 or are connected with the output of the filter via the input inductor. The corresponding driving and control circuit 1330 of the PFC is configured to control the power switch devices; specifically, the corresponding driving and control circuit 1330 of the PFC comprises an output sampling voltage divider 1331 that is configured to sample the output $V_{Dc}$ of the PFC main circuit; input sampling voltage dividers 1332, 1333, 1334 are configured to sample the input voltage $V_{Ac-P}$ and $V_{Ac-N}$, and a sampling circuit for sampling the input current $I_L$. After being compared with the corresponding reference signal $V_{Dc-ref}$, the output signal $V_{Dc}$ of the output voltage sampling voltage divider 1335 is outputted by a voltage loop controller 1335 as a signal, which is calculated with the $V_{AC}$ to obtain a reference signal $I_{L-ref}$ of the input current $I_L$; after the input current $I_L$ is calculated and compared with the $I_{L-ref}$, it passes a current loop controller 1336 to obtain a corresponding control signal PWM-S1 and PWM-S2 for controlling the switches S1 and S2.

Figure 14:
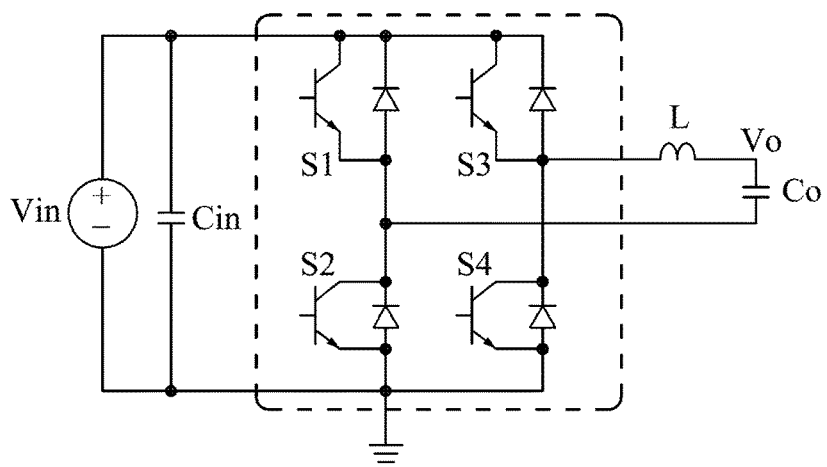

The present disclosure is also suitable to be used in the DC/AC setting, such as the inverter. FIG. 14 illustrates a power unit 120 comprising an inverter circuit; the DC input Vin passes a first bridge-arm composed of serially-connected active switching elements S1, S2 and a second bridge-arm composed of serially-connected active switching elements S3, S4 to give an AC signal; the signal passes a filtering circuit (comprising a filtering inductor L and an output capacitor Co) and then generates an output voltage Vo on the output capacitor Co. The specific control and driving circuit is not shown herein. Such inverter can also adopt a stacking structure that is similar to those described above regarding the PFC circuit. That is, the control unit is integrated from the first and second bridge-arms, the input capacitor Cin and the control driving circuit of the main circuit, while the power unit is integrated from the output filtering inductor L and the output capacitor Co. Of course, it is also feasible to integrate all elements of the main circuit (i.e., the output capacitor Cin, the S1 to S4, the filtering inductor L and the output capacitor Co) to form the power unit 120, and integrate the control unit to form the control and driving circuit.

Examples of Control Unit

The main purpose of the control unit is signal processing, and the height of most components thereof is smaller; hence, to improve the overall utilization percentage of the space, it is possible to use the thinness of the elements comprised in the unit as an evaluation index.

Figure 15:
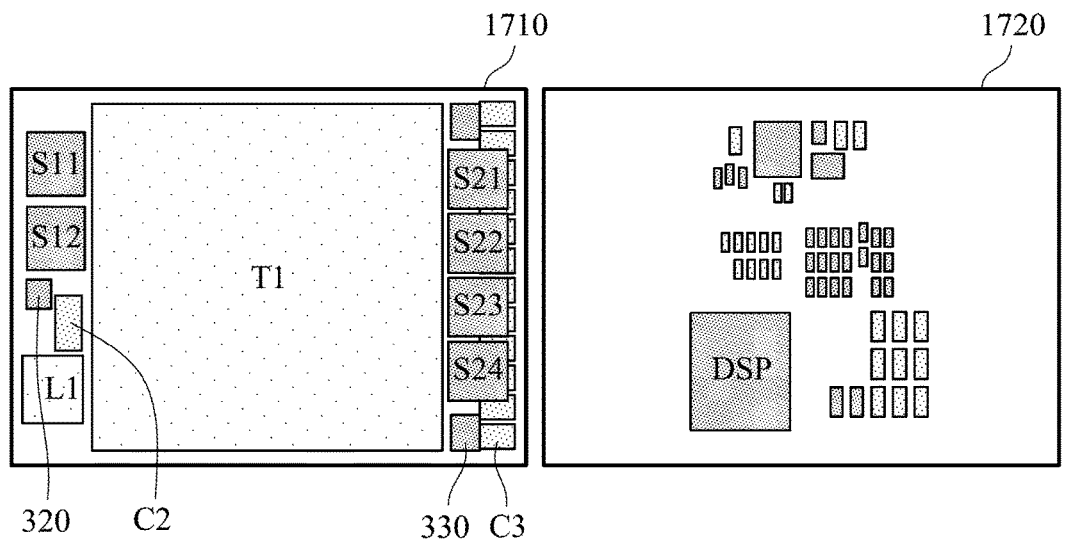
FIG. 15 to FIG. 16 illustrate the embodiments covered by the control unit and the power unit according to embodiments of the present disclosure.
Figure 16:
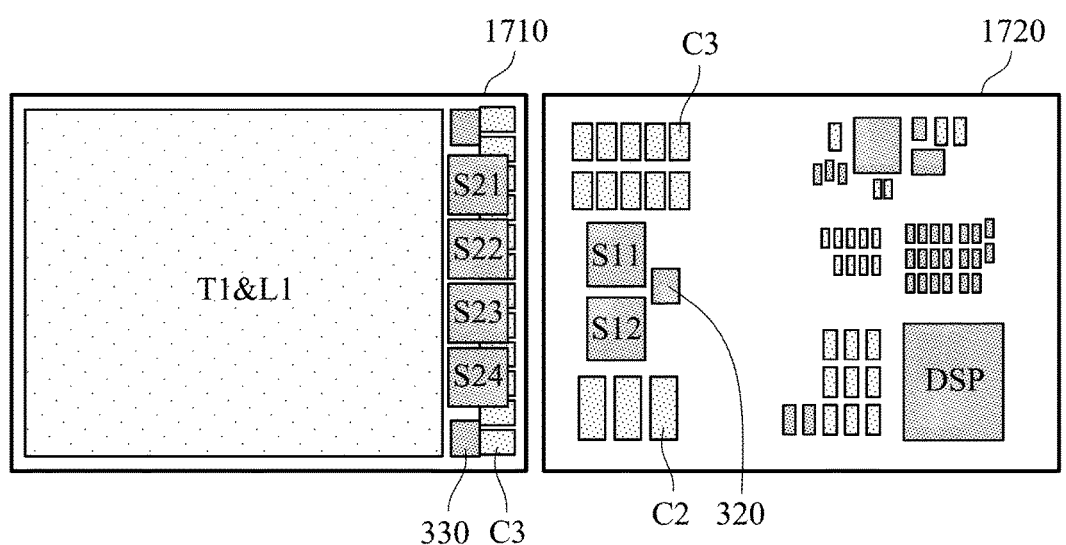

As discussed hereinabove, the controller (under certain specific application, the driving circuit can be viewed as part of the controller) responsible for sending the signal to the driving circuit or switch devices and elements necessary to the peripheral circuit thereof (such as the resistor, capacitor, etc.) must be comprised in the control unit. However, with the improvement of the integration level of the control chip, after these components/elements are disposed, there might be certain space left thereon. Accordingly, it is possible to add more components/elements in the control unit. Take FIG. 3 as an example; if all the power components are disposed in the power unit 120, the layout of these components is illustrated in FIG. 15. In FIG. 15, the left-hand side illustrates the layout of the components/elements of the power unit 120, and the right-hand side illustrates the layout of the components/elements of the control unit 130. In FIG. 15, the square box indicates the bearing plates 1710, 1720 on which the components/elements are placed; as to the components/elements disposed on the bearing plate 1710, 1720, those illustrated in the left-hand side correspond to components/elements illustrated in FIG. 3. As illustrated in FIG. 15, if the area of the power unit 120 and the area of the control unit 130 are the same (that is, the areas of the bearing plates 1710, 1720 of the two units are the same), apparently, the utilization percentage of the control unit 130 is low. To increase the utilization percentage of the area of each unit, it is feasible to move some components/elements from the power unit to the control unit 130; as illustrated in FIG. 16, the primary switch tube S11, S12 is disposed at a position in adjacent to the lateral side of the control unit (i.e., they are disposed on the bearing plate 1720 of the control unit 130. In addition to the thinness, the standard for selecting the components/elements to be moved also includes whether it will affect the electric characteristics and whether it will achieve better functions.

The primary side switch tubes S11, S12 at the high-voltage input side are semiconductors, as such, the thickness thereof is similar to or even thinner than the control chip, and hence, they could be placed in the control unit. For example, when the switch tubes S11 and S12 at the primary side are MOSFETs, if they are placed in the power unit, as illustrated in FIG. 3, there are more than 4 pins (the gate electrode and source electrode for each switch) for the interconnection of the power unit 120 and control unit 130; if they are placed in the control unit 130, there is only two pins for the interconnection of the control unit 130 and the power unit, such as the connection point of the switch tubes S11 and S12 at the primary side and the source electrode of the switch tube S12, as illustrated in FIG. 11. Moreover, since the high-voltage input side is not particularly sensitive to the distribution parameter of the circuits, the effect to the electric characteristics resulted from moving them to the control unit 130 is within the acceptable range. Of course, if the switch tubes 311 and S12 at the primary side are moved, the input capacitor C1 and the driving circuit thereof should also be moved to the control unit 130. Putting these elements in close proximity will not only reduce the voltage peak of the switch tubes S11 and S12 at the primary side, but also reduce unnecessary pins in the power unit.

FIG. 16 is a schematic diagram illustrating an embodiment where some of the switch devices are disposed in the control unit 130. The control unit 130 comprises an input capacitor C1, the resonant capacitor C2 and the primary side switch tubes 311, 312; the power unit 120 comprises a plurality of switch devices and a bearing plate 1710 for bearing the switch devices (such as, 311, S12), as well as an insulation material 3430 (illustrated in FIG. 25) for encapsulating the switch devices; the switch devices are distributed at a position along the pads 3440 (illustrated in FIG. 25). The power unit 120 comprises a transformer T1, a resonant inductor L1, an output capacitor C3 and secondary side switch tubes S21, S22, S23, S24. As could be seen, the utilization percentage of the left-hand side of the control unit 130 is significantly increased, while the inductor (i.e., the resonant inductor L1), the capacitor (i.e., the output capacitor C3) and switch devices (i.e., secondary side switch tubes S21, S22, S23, S24) are disposed at a position on the bearing plate 1710 in adjacent to the lateral side of the power unit. On the left-hand side of the power unit 120, more space is left for the magnetic element, which is significant to the increase of the efficiency. Accordingly, embodiments of the present disclosure may take care of both the high efficiency and high power pressure. It should be noted that since the switch tubes S11, S12 are not disposed in the power unit 120, the input of the power unit 120 comes from the control unit 130, and is a high frequency AC power signal modulated by the switch tubes 311, S12; for example the frequency of the signal is about 500 KHZ or even higher than 3 MHZ, and the value may be less than 12 V to more than 400 V.

If, in certain applications, the positions of the secondary side switch tubes S21, S22, S23, S24 are not sensitive to the electric characteristics, it is also possible to dispose the secondary side switch tubes S21, S22, S23, S24, the driver 330 and the output capacitor C3, as well as the Oring MOS in the control unit 130 so as to further increase the space utilization percentage.

Regarding the stacking structure illustrated in FIG. 10, if the control unit 130 is disposed at the lower position, the control unit 130 will be sandwiched between the power unit 120 and the main board 110; then the pins from the output terminal of the power unit 120 to the main board become longer, which might affect its ability to response to the variation of load, in particularly in cases where the load is a data processing chip like the CPU. In this case, it is possible to dispose part of the output capacitor C3 (or the corresponding POL output capacitor C4 illustrated in FIG. 11) of the main circuit in the control unit 130; in this case, the control unit 130 comprises the output capacitor C3, thereby reducing the effect resulted from the length of the pins. Of course, to do this, it is a requisite that there is a good connection between part of the output capacitor C3 and pins 140.

Figure 25:
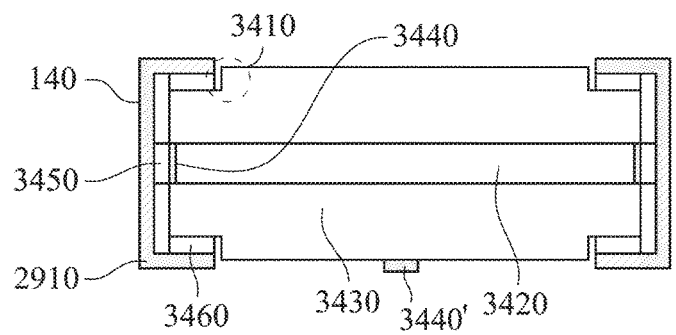

In the above-mentioned embodiments, the control unit 130 comprises a bearing plate, such as the printed circuit board or the lead frame, etc. Of course, the whole control unit 130 can be implemented by an embedding technique. The control unit 130 can also uses inter-stacking elements within the unit, so that the surface conductors of the elements are used for electric connection. Using the embedding technique, some electric elements, such as the control IC, the resistor, the capacitor and even the power semiconductor are embedded in the bearing plate. In this way, the control unit is very thin and the area thereof is very small; also, a more delicate circuit wiring at the internal and surface of the unit can be achieved. By using the embedding techniques, one can easily achieve the interconnection between the upper and lower surfaces without limited by the position; that is, it can directly use the corresponding pins without using the pins injected from the lateral side, which is illustrated in FIG. 25. For example, a circuit comprising a transformer and a synchronous rectifier, such as a bridge resonant circuit, can be used to implement a control unit using the embedding technique then, the control unit is stacked with a power module comprising the transformer and synchronous rectifier, and the resultant circuit is characterized in that: the power unit comprises at least one transformer (Core and Winding), the output synchronous rectifier, part of the output capacitor, the control signal of the SR MOS (generated by the power module or provided by the control unit), so as to achieve a high efficiency of the power stage; the power unit still uses the pins (Pin) injected from the lateral side, the Pin comprises the positive and negative electrodes of the output, and the two electrodes of the high frequency pulse at the input side that has been modulated. The control unit comprises an embedded control logic IC, responsible for sampling, controlling signal and driving the signal generation, protecting, and necessary communication to the outside of the power supply, as well as at least one pair of power elements at the high-voltage side, responsible for generating the input-side high frequency pulse to be transmitted to the power unit; the pins of the control unit can be arranged at the lateral side or passing through the upper or lower surface, depending on the need, or can be arranged to form the connection from the internal position to the surface and arranged at the surface as needed; after the embedding, the control unit is very thin, e.g., about 1 mm; accordingly, the Pins can be mainly the SMD pins, so as to enhance the connection strength of the Pins. By using the embedding technique, one can easily achieve the wiring capability similar to the PCB, so as to implement more complex interconnection at the surface, and support the stacking combination with more content, for example, disposing some necessary elements that is difficult to be embedded in the control unit, e.g., the input EMI filter (i.e., the input capacitor) together with the power unit at the surface of the control unit. This embodiment achieve a very small size, and hence, it is more suitable in high-frequency operating settings, such as the one with an operation frequency of more than 1 MHZ. Hence, the converting circuit is preferably a resonant-type circuit. The thickness of the embedded-type control unit is preferably less than 2 mm.

The control unit 130 can be the assembly of the control circuits according to the above-mentioned examples, can be a control circuit comprising some components/elements of the power circuit, and even the driving circuit; alternatively, it can also be a power supply converter with full function, such as the one as illustrated in FIG. 7. In this way, the control unit and the power unit are stacked together, and connected through pins, as well as connected to the main board through the pins, thereby achieving a structure with two or more inter-stacking power units. Nonetheless, at least one of the power units comprises the components/elements of the control unit. Such structure is often suitable for use in a system infrastructure with multi-stage power unit in parallel connection or cascaded connection.

Examples of Power Unit

In sum, the power unit can be a complete DC/DC or AC/DC power supply converter that can operate on its own, such as, the isolated transforming module DCX, the point-of-load (POL) DC converter, the front regulate module (FRM), the regulated bus converter (RBC), the PFC circuit, the auxiliary power supply module, etc.; that is, one power supply converter that comprises the power stage circuit and the control circuit; alternatively, it could be only the power stage circuit thereof, or even a portion of the power stage circuit such as those described in the above embodiments; said portion can be the part that should be placed in proximity, such as the three key elements illustrated in FIG. 16, that is, the transformer T1, the output rectifying element (e.g., the secondary side switch tubes S21, S22, S23, S24) and the output capacitor C3. The power unit may have the isolation capability of the isolated transforming module DCX, RBC; that is, it comprises at least one transformer; or it may not require the isolation, like the point-of-load (POL) DC converter, the front regulate module (FRM), and the PFC circuit; that is, it comprises at least one inductor.

The transformer and inductor on the power unit can be integrated or separated.

The input of the power unit can be a direct current or an industrial-frequency alternating current, or the high-frequency alternating current illustrated in FIG. 16.

The output of the power unit can be within various voltage ranges, such as 0.1 to 12 V, or 12 V to 400 V. The load can be another power supply converter, the hard drive, the memory, the graphic processing chip, the CPU, the communication ASIC, or other data processing chips.

Moreover, the power unit, just like the control unit, may comprise a bearing plate, such as the printed circuit board or the lead frame, and the electric connection among the components of the power unit is achieved by the trace on the bearing plate, the components/elements of the power unit can also be placed on the bearing plate; or can be implemented by the embedding technique; that is, the electric element, such as the transistor and the capacitor are embedded in the bearing plate. Moreover, the power unit can also uses inter-stacking elements within the unit, so that the surface conductors of the elements are used for electric connection When the whole circuit comprises two or more power units, it is possible to use identical power units that are in parallel connection to implement a conversion of higher power and higher current; or they can be serially connected to implement a conversion of higher power and higher voltage; alternatively, different power units that are serially connected (as illustrated in FIG. 8) are used to achieve a greater operating range; or different power units can be used, in which they share a common input to provide the power supply conversion of multiple outputs; or different power units can be so that one output can receive the power supply conversion from multiple inputs.

In view of the foregoing, the application range of the present disclosure is quite broad; it may enhance the performance of the server. Of course, the method for implementing the power converter is also suitable for use in other application settings.

Design of Stack Structure

In one aspect of the present invention, in one server, a power supply converter is divided into at least two units, i.e., at least one control unit 130 and one power unit 120, that are stacked to take full advantage of the height, thereby providing a power supply converter with high efficiency and high power pressure, so as to provide a server with better performance. The stacking of the power supply converter are as follows.

Figure 17:
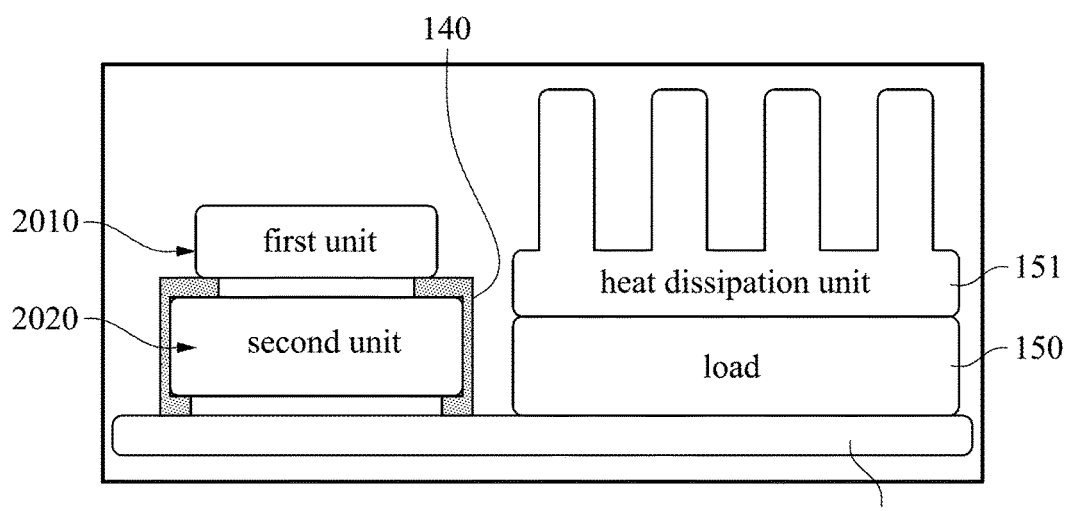
FIG. 17 to FIG. 20 illustrate the stack structure design according to embodiments of the present disclosure.
Figure 18:
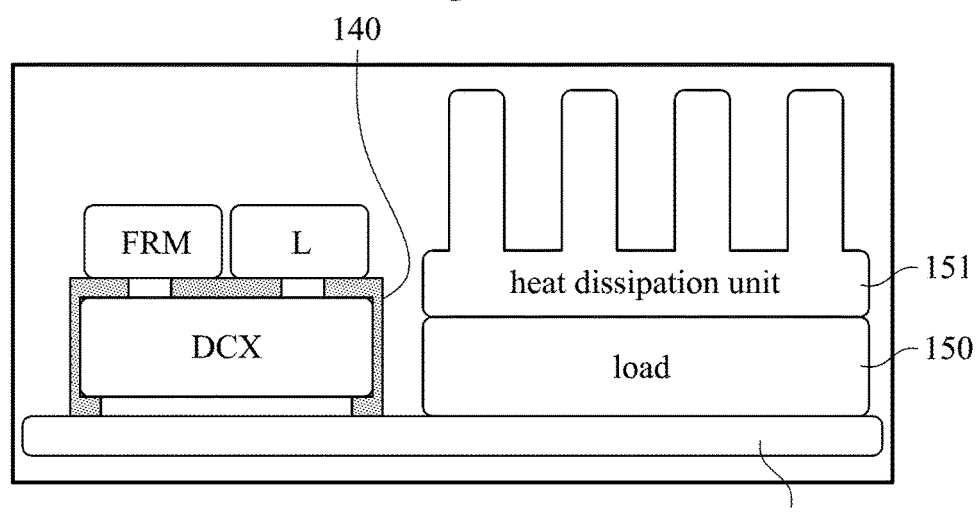

As illustrated in FIG. 17, the unit with a greater area among the control unit and the power unit is used as the first unit 2010, while the one with the smaller area is used as the second unit 2020; the first unit 2010 is disposed between the second unit 2020 and the main board 110; the area of each unit 2010, 2020 differs, and the smaller one is stacked on the bigger one to form a power supply converter which is then disposed on the main board 110. As illustrated in FIG. 18, the control unit and the power unit are integrated as an isolated transforming module DCX, and front regulate module (FRM); this is one implementation of the above-mentioned front regulate module (FRM)+isolated transforming module DCX infrastructure; however, to achieve a higher efficiency, the external inductor L of the front regulate module (FRM) is disposed outside. The front regulate module (FRM) and the external inductor L are then disposed above the isolated transforming module DCX to form a power supply converter, which is then disposed on the main board 110.

Figure 19:
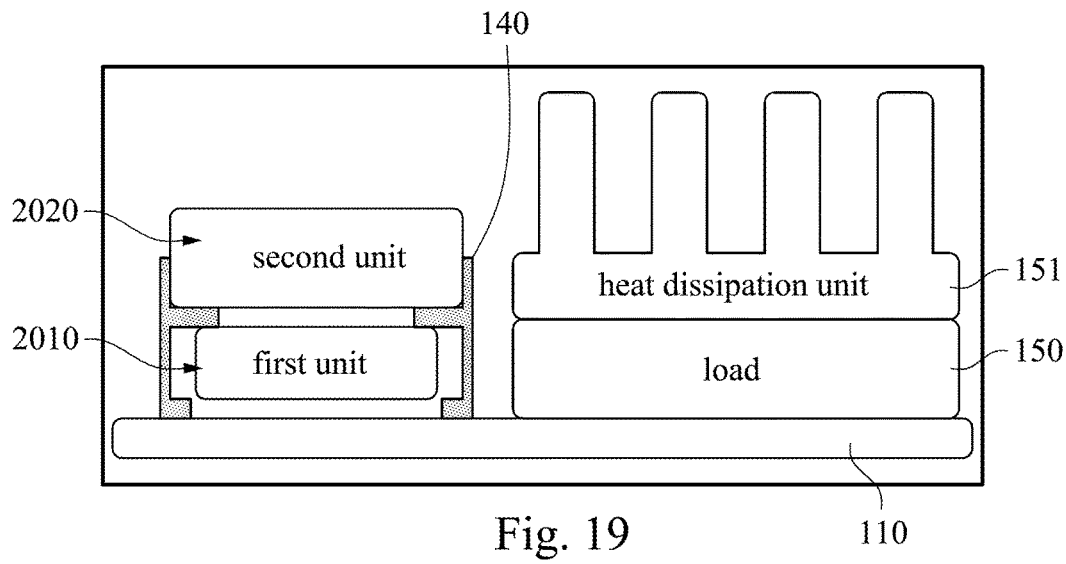

As illustrated in FIG. 19, the unit with a greater area among the control unit and the power unit is used as the first unit 2010, while the one with the smaller area is used as the second unit 2020; the second unit 2020 is disposed between the first unit 2010 and the main board 110; the area of each unit 2010, 2020 differs, and the smaller one is stacked at the lower surface of the bigger one to form a power supply converter which is then disposed on the main board 110.

Figure 20:
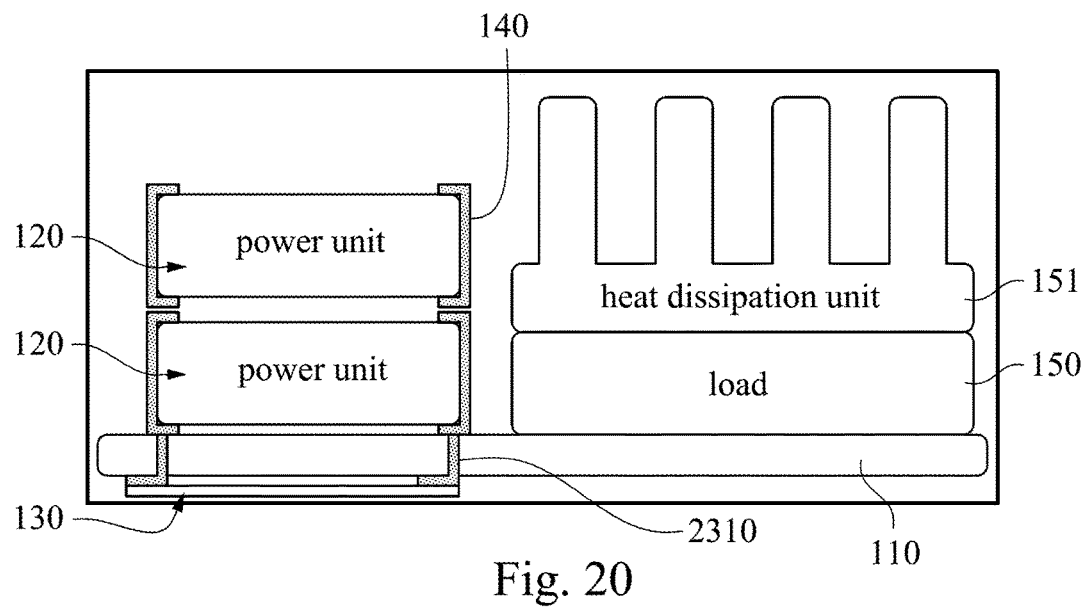

As illustrated in FIG. 20, the power unit 120 and the load are disposed at one side of the main board 110, while the control unit 130 is disposed on the main board 110 at a side that is opposite to the power unit 120; the power unit 120 and the control unit 130 are respectively disposed at the opposite surfaces of the main board 110; that is, each unit 120, 130 is respectively disposed at the upper and lower surfaces of the main board 110; the control unit 130 is electrically connected to the pins 140 via the conducting through holes 2310 of the main board 110; the overlapping part of the projection areas of the units accounts for at least one-third of the projection area of said unit. Apparently, due to the limitation of dissipation and the thickness, it is preferably that the control unit 130 is disposed at the lower surface of the main board, and the power unit 120 is disposed at the upper surface of the main board 110.

Obviously, the above-mentioned implementation means can effectively utilize the height, so as to achieve both the high efficiency and high power pressure of the power supply, to give a power supply module with better performance, especially in applications such as the server power supply.

Pads Arrangement and Implementation

Figure 21:
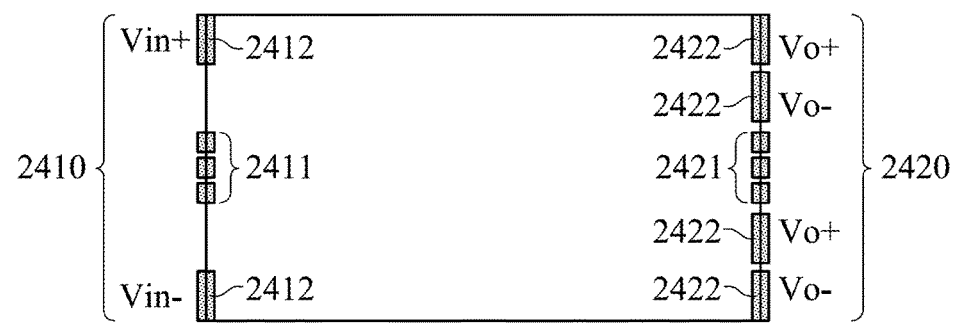
FIG. 21 to FIG. 25 illustrate the pin arrangement according to embodiments of the present disclosure.

A power supply converter comprises many pins. Pins involved in the connection between the converter and the system include, for example, converter power input/output pins, and pins for system communication, and pins for internal interconnection, such as the connection between the power unit and the control unit. Since the terms pins has a specific definition, here, the pins injected from the components/elements on the bearing plate is referred to as the pads. Referring to FIG. 21, the pads can be divided into two main types, the power pads and the signal pads, depending on the current level. The power pads are the pads that the converter power current passes pads, which is generally responsible for the electric connection between components/elements of the power circuit; since the current level passing them is higher, these pads are often thicker; that is, the cross-sectional area of the pad is bigger. The signal pads are the pads responsible for transmitting the signal in the converter; for example, the control circuit in the control unit often transmits the control signal to the driving circuit through the signal pads so as to control the conduction and turning-off of the power components/elements. Generally, the current level passing through control pads is lower, and hence, the pads are thinner; that is, the cross-sectional area thereof should not be too big, and the size often depends on the capability required.

When the power supply converter is an isolated circuit (the isolation is often achieved by the transformer of the power circuit); that is, the input/output thereof has the requirement of isolated safety voltage. Hence, depending on the position thereof, the pads can divided as the primary lateral group pads (i.e., the pads disposed at the primary side of the transformer) and secondary lateral group pads (i.e., the pads disposed at the secondary side of the transformer). The two groups of pads should be separated by a specific distance to meet the safety requirement; for example, when the input of the converter is 400 V, an isolation of at least 2000 V is required and hence, any pads in one group should be separated from any pads in the other groups by at least 4 to 8 mm; while when the input is 36 to 72 V, an safety isolation voltage of 1500 V is often required, and the distance is 1 to 4 mm. Regarding the primary lateral group, since the voltage of the input is relatively high, the current is smaller, and the cross-sectional area of such pads is relatively small. For the secondary lateral group, since the voltage is lower, the current is higher, and hence, the cross-sectional area of the pads is greater. For example, for the 48 V to 1 V converter, the difference of the current is 48 folds, if the same current density is used to define the volume of the pads, there would be a 48-fold difference, and it is obvious that the secondary lateral group requires more position for the disposition.

Figure 22:
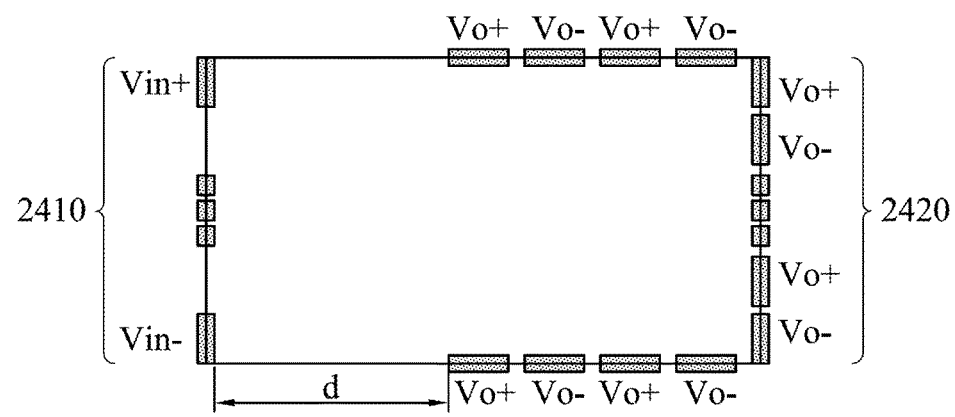

The pads can be disposed at the four sides of the power unit, as illustrated in FIG. 21 and FIG. 22. In FIG. 21, the primary lateral group pads 2410 and the secondary lateral group pads 2420 respectively occupy the two sides of the power unit, and said two sides are parallel to each other; the primary lateral group pads 2410 comprises first signal pads 2411 and first power pads 2412, the cross-sectional area of the first power pads 2412 is greater than the cross-sectional area of the first signal pads 2411; the secondary lateral group pads 2420 comprises second signal pads 2421 and second power pads 2422, the cross-sectional area of the second power pads 2422 is greater than the cross-sectional area of the second signal pads 2421, the number of the second power pads 2422 is greater than the number of the first power pads 2412. The arrangement in FIG. 21 is suitable for applications with lower output current. FIG. 22, on the other hand, is suitable for use in application with higher current output; the primary lateral group pads 2410 are distributed along one side of the unit, and the secondary lateral group pads 2420 are distributed along the remaining three sides of the unit, and are spaced from the primary lateral group pads 2410 by a safety distance d. When the current is higher, a single pad has a great electrical characteristics; when multiple pads are required, i.e. multiplex pads, they can be arranged in alternating positive and negative electrodes, such as, Vo+, Vo−, so that the induction resistance of the pads is as low as possible; in this way, when applied in loads like CPU, there is a better dynamic response and reduce the utilization rate of the capacitor of the main board.

Figure 23:
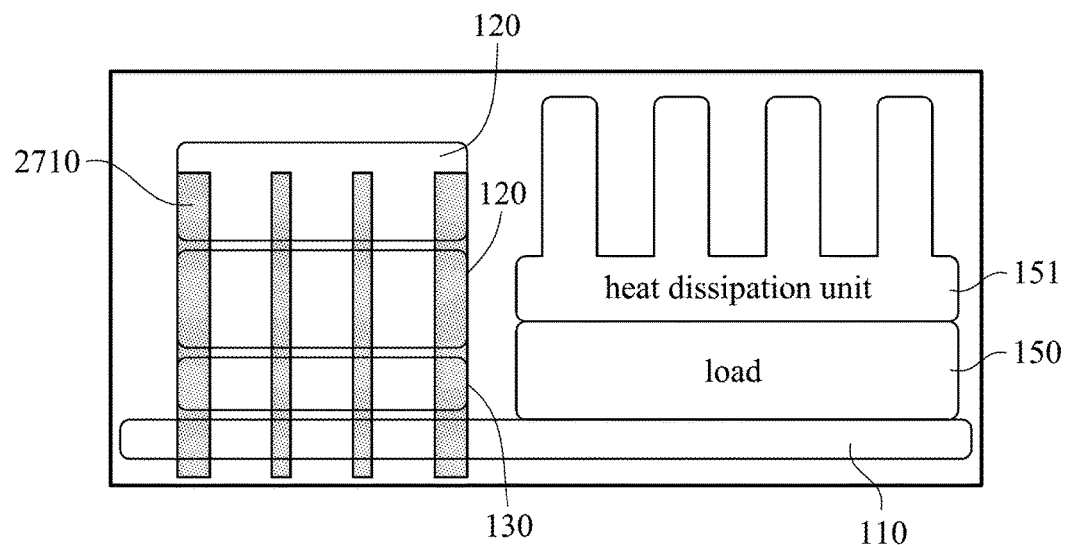
Figure 24:
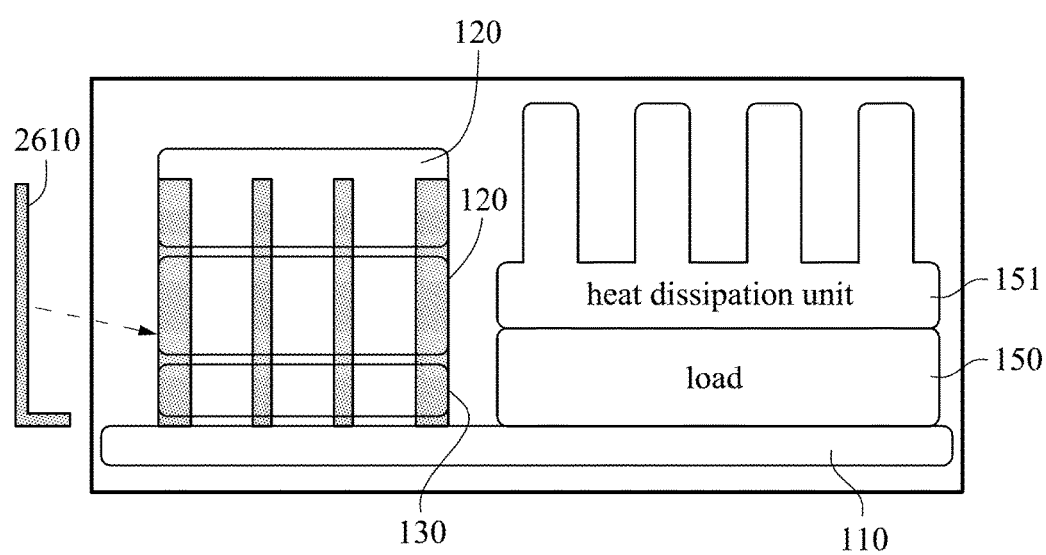

In the present application, the pins are electrically coupled with the pads. FIG. 24 is a front view illustrating the connection of the pins and pads for implementing the interconnection of each unit. In FIG. 24, the exemplified pins are surface-mount pins. The L-shaped surface-mount pins 2610 electrically connects each unit 120, 130 to form a power supply converter with the surface-mount pins, which is then disposed on the main board 110. After changing the pins to the I-shaped pins, the power supply converter with the I-shaped in-line pins 2710 (as illustrated in FIG. 23) is formed.

FIG. 25

Before the assembly of the pins 140, each unit 120, 130 can be encapsulated with the packaging technique such as molding or embedding to for a regular surface, such as the recess 3410 illustrated un FIG. 25; since the insulation material 3430 has the recess 3410 disposed thereon for fitting the installation of the pins 140, it is more advantageous to the delicate utilization of the space, and then the surface-mount pins are installed thereon. Specifically, any one of the control unit and the power unit comprises a bearing plate 3420 and insulation material 3430; the insulation material 3430 is formed on the two opposite surfaces of the bearing plate 34201 the lateral side of the bearing plate 3420 is disposed with the pads 3440; the soldering material 3450 on the pads 3440 is soldered to the pins 140. At the edge of the upper and lower surface of the insulation material 3430, there is a recess 3410; the two terminals of each pin 140 has the SMD pad 2910 extending to the recess 3410 at the upper and lower surfaces, the recess 3410 has the bonding material 3460 disposed thereon for bonding with the SMD pads 2910.

The unit illustrated in FIG. 25 can be any of the above-mentioned power unit and/or control unit; the pads 3440 are distributed along the lateral side of the power unit and the lateral side of the control unit; the pins 140 and pads 3440 are electrically coupled. The pins 140 are surface-mount pins, and are distributed along the outer surface of the power unit and control unit, and are electrically coupled to the pads 3440. The pads 3440' are further distributed along a side of the power unit that is perpendicular to the side at which the and pads 3440 are disposed; although in FIG. 25, the pads 3440' are only distributed along the lower surface; the present invention is not limited thereto; in one embodiment, pads are distributed along the lateral side of the power unit 120 and the upper and lower surfaces of the control unit 130, and the pins 140 and pads 3440 are electrically coupled.

The surface-mount pins can be installed on each surface of the unit, but in order to achieve a better dissipation effect and to further reduce the overall size of the module, in the above examples, the pads are disposed at the lateral side of the bearing plate in each unit, and the surface-mount pins are soldered to connect with in injected pins of the components of the unit and the control signal injected pins. However, under certain special circumstances, as illustrated in FIG. 33, the pads in the first unit 2010 can also be disposed at the stacking surface of the second unit 2020 and the inductor L, and the pins are used to implement the typical connection between the first unit 2010 and the second unit 2020 and the inductor L. The contact surface other than the solder points of the pins and pads can be applied with glues or the like, so that the pins are bonded to the surface of each unit, thereby increasing the mechanical strength and the reliability.

Heat Dissipation

After stacking each unit to form a module, the heat dissipation pathway is altered, as compared with the conventional design in which the units are individually disposed.

Figure 26:
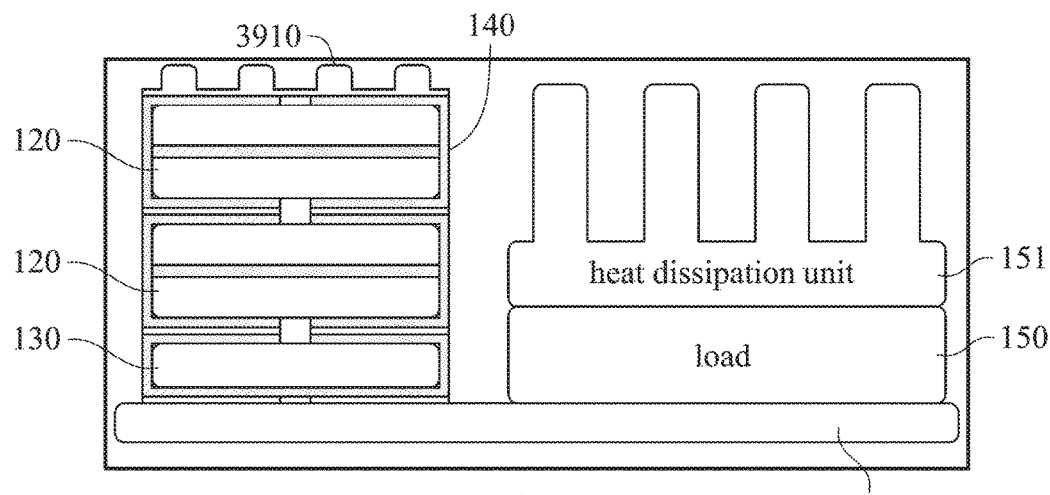
FIG. 26 illustrates the infrastructure for heat dissipation according to embodiments of the present disclosure.
Figure 27:
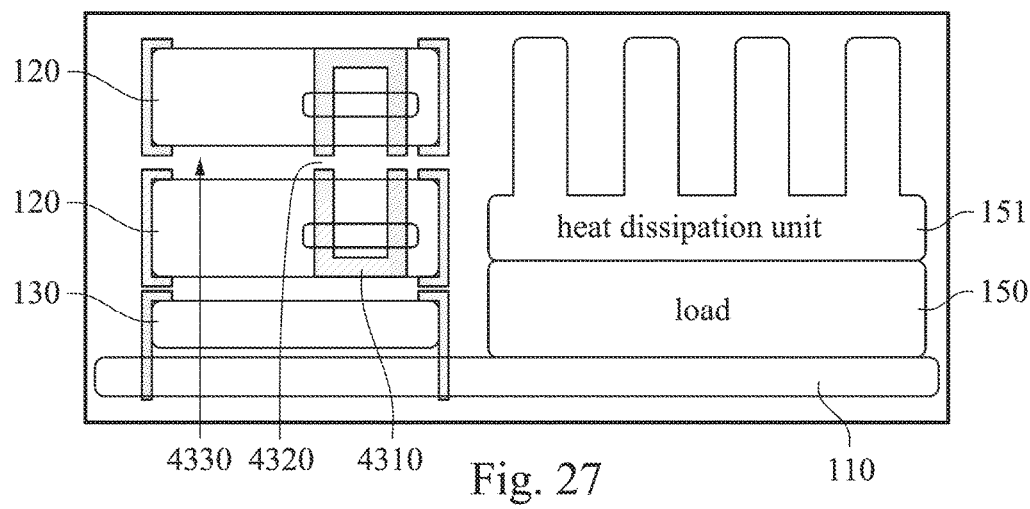
FIG. 27 illustrates the arrangement of the magnetic core according to embodiments of the present disclosure.

FIG. 26 illustrates the installation of the heat dissipation unit. As illustrated in FIG. 26, the electrically-isolated heat dissipation unit 3910 is disposed on the power unit 120; the power unit 120 is disposed on the control unit 130; the control unit 130 is disposed on the main board 110; or, as illustrated in FIG. 40, the electrically-isolated heat dissipation unit 4010 is disposed on the lateral sides of the power unit 120 and the control unit 130. It can be disposed at the upper surface or the lateral side of the assembled module. To avoid affecting the electric characteristics of the module, the heat dissipation unit can be an electric insulation material, such as the ceramic. Alternatively, when the heat dissipation unit is a conducting material such as aluminum, copper, graphite, etc., thereby should be a thermal-conducting and electrical-insulation material (such as the ceramic sheet or the like) between the heat dissipation unit and the pins. The heat dissipation units are all disposed above the pad or pin assembly. To ensure the heat dissipation effect, the thermal resistance between the heat dissipation unit and the pad or pin assembly should be less than 5° C./Watt. There is an insulation material between the heat dissipation unit and the pad or pin assembly.

OTHER OPTIMIZED EMBODIMENTS

According to the above-mentioned example, it is feasible to achieve a greater power by stacking multiple power units.

Generally, these power units use the magnetic elements with the similar using/operating condition, such as a transformer or an inductor.

As illustrated in FIG. 43, since the magnetic element often has an air space 4320, and the conductor nearby is often inducted and heated by the magnetic flux leaked from the air space 4320, thereby causing loss. By sharing the magnetic core 4310 through stacking, the air space 4320 of the magnetic core 4310 can be disposed at the stacking space 4330 between the power units 120, thereby keeping the air space from the conductor so as to reduce the loss.

According to the above-mentioned embodiments, the power unit and the control unit are vertically stacked to form a power supply module. In fact, if the power supply is rotated by 90 degrees so that the power unit and the control unit are stacked horizontally, and are interconnected with each other and are respectively connected with the main board through the pins, this structure also has desirable applicability. Therefore, according to embodiments of the present disclosure, the power unit and the control unit can not only stack above each other, but also stack to the left or right of each other in the horizontal direction.

In view of the foregoing, using the Quasi-Cascade components, optimized driving, optimized application and optimized packaging disclosed herein, it is possible to increase the power density or efficiency of the power supply converter, thereby achieving a better electric performance, higher frequency performance and greater reliability, as compared with conventional technology. In this way, the characteristics of the components can be fully utilized, and it is more convenient to use the apparatus with the present packaging solution; therefore, the present disclosure facilitate the improvement of the power density or efficiency. The specific driving, application and packaging means provided by the present disclosure are quite feasible and effective. The present invention is suitable for improving the overall performance and the cost/performance ratio of the power supply converter.

Although various embodiments of the invention have been described above with a certain degree of particularity, or with reference to one or more individual embodiments, they are not limiting to the scope of the present disclosure. Those with ordinary skill in the art could make numerous alterations to the disclosed embodiments without departing from the spirit or scope of this invention. Accordingly, the protection scope of the present disclosure shall be defined by the accompany claims.

What is claimed is:

1. A power supply apparatus, comprising:
a power unit electrically connected with a motherboard, comprising a first base plate, at least a power switch chip allocated at the first base plate and a plurality of pads;
a control unit stacked with the power unit, comprising a second base plate and at least a control chip for controlling the power switch chip turn on/off in the power unit and a plurality of pads; and
a plurality of pins for electrically connecting the power unit to the control unit and mother board and allocated at periphery of the power unit and control unit;
wherein the plurality of pads of the power unit and control unit are allocated on side facet of the first base plate and second base plate respectively, both plurality of pads of the power unit and control unit are electrically connected with the plurality of pins so that the power unit and the control unit are electrically connected with each other, the power supply apparatus provides a power source for a load in the neighborhood thereof on the motherboard.

2. The power supply apparatus of claim 1, wherein the first base plate and the second base plate are in a substantially same size.

3. The power supply apparatus of claim 1, wherein the second base plate integrates a power switch chip to improve area utilization thereof.

4. The power supply apparatus of claim 1, further comprising molding material, wherein the molding material encapsulates the power unit and control unit respectively, the plurality of pads of the power unit and control unit emerges from molding material respectively.

5. The power supply apparatus of claim 4, wherein the molding material of the control unit has a plurality of recesses reserved for connection with the pins thereof.

6. The power supply apparatus of claim 4, wherein the molding material encapsulates two sides of the power unit.

7. The power supply apparatus of claim 6, wherein the power unit further comprises bottom pads emerged from one side of power unit that is encapsulated by the molding material for adjacent electrical connection thereof.

8. The power supply apparatus of claim 1, further comprising another power unit stacked with the power unit and the control unit, wherein the another power unit is parallel connected with the power unit and controlled by the control unit.

9. The power supply apparatus of claim 8, wherein each of the power unit and the another power unit has a magnetic device, the magnetic devices of the power unit and the another power unit share the same magnetic core.

10. The power supply apparatus of claim 1, wherein the plurality of pins cover outer surface of the power unit and the control unit respectively.

11. The power supply apparatus of claim 1, wherein the power unit is the one close to the motherboard, the control unit is the other one stacked on the power unit.

12. The power supply apparatus of claim 1, further comprising:
a heat sink, attached with the power unit to improve heat dissipation.

13. A power supply apparatus, comprising:
a first stage power converter receiving a power source from a mother board and configured with a plurality of pads located on side facet thereof;
a second stage power converter configured with a plurality of pads located on side facet thereof and stacked with the first stage power converter to receive an output of the first stage power converter to provide a power to a load in adjacent area thereof on the motherboard; and
a plurality of pins connected with the pads of the first or/and second stage power converter and the motherboard to realize the electrical connection therebetween.

14. The power supply apparatus of claim 13, wherein the output voltage of the second stage power converter is lower than the output voltage of the first stage power converter.

15. The power supply apparatus of claim 13, wherein the first stage converter and the second stage converter are configured in a substantially same size.

16. A power supply apparatus, comprising:
a first unit electrically connected with a motherboard, comprising a first base plate, and at least a power switch chip allocated at the first base plate;
a second unit stacked with the first unit;

a plurality of pins for electrically connecting the first unit to the second unit and mother board and allocated at periphery of the first unit; and a plurality of pads distributed along a lateral side of the first unit and a lateral side of the second unit, and electrically coupled with the plurality of pins, wherein the plurality of pins include surface-mount pins, and are distributed along the outer surface of the first unit and the second unit, so that the first unit and the second unit could electrically connected with each other, the power supply apparatus provides a power source for a load in the neighborhood thereof on the motherboard.

17. The power supply apparatus of claim 16, wherein the second unit has a surface facing the first unit and a plurality of connection pads disposed on the surface.

18. The power supply apparatus of claim 17, wherein the pins extend along the out surface of the first unit to connect the connection pad of the second unit with the first unit.

* * * * *